United States Patent
Awbrey et al.

(10) Patent No.: US 9,267,074 B2
(45) Date of Patent: Feb. 23, 2016

(54) SYSTEMS AND METHODS FOR PROCESSING GLYCEROL

(76) Inventors: Spencer S. Awbrey, Conroe, TX (US); John Deloach, Daisetta, TX (US); Tony Alexander, Daisetta, TX (US); Don Darbonne, Liberty, TX (US); Marilyn Darbonne, legal representative, Liberty, TX (US)

( * ) Notice: Subject to any disclaimer, the term of this patent is extended or adjusted under 35 U.S.C. 154(b) by 248 days.

(21) Appl. No.: 14/118,999

(22) PCT Filed: May 25, 2012

(86) PCT No.: PCT/US2012/039744
§ 371 (c)(1),
(2), (4) Date: Nov. 20, 2013

(87) PCT Pub. No.: WO2012/162680
PCT Pub. Date: Nov. 29, 2012

(65) Prior Publication Data
US 2014/0106993 A1  Apr. 17, 2014

Related U.S. Application Data

(60) Provisional application No. 61/489,954, filed on May 25, 2011.

(51) Int. Cl.
*C09K 8/528* (2006.01)
*C05B 15/00* (2006.01)
(52) U.S. Cl.
CPC .................. *C09K 8/528* (2013.01); *C05B 15/00* (2013.01)

(58) Field of Classification Search
None
See application file for complete search history.

(56) References Cited

U.S. PATENT DOCUMENTS

| | | |
|---|---|---|
| 2002/0039971 A1 | 4/2002 | Hayashi et al. |
| 2003/0206955 A1 | 11/2003 | Sonneville-Aubrun et al. |
| 2009/0054694 A1 | 2/2009 | Peterson et al. |
| 2009/0068544 A1 | 3/2009 | Ragsdale et al. |
| 2009/0216040 A1 | 8/2009 | Benecke et al. |
| 2009/0275787 A1 | 11/2009 | Forster et al. |
| 2011/0044972 A1 | 2/2011 | Fieldhouse et al. |

FOREIGN PATENT DOCUMENTS

JP  6184024 A  7/1994

OTHER PUBLICATIONS

International Search Report of PCT/US2012/039744 dated Aug. 8, 2012.
International Preliminary Report on Patentability of PCT/US2012/039744 dated Nov. 26, 2013, 9 pages.

*Primary Examiner* — Yevegeny Valenrod
(74) *Attorney, Agent, or Firm* — Edmonds & Nolte, P.C.

(57) ABSTRACT

Systems and methods for processing glycerol into one or more products and uses thereof are provided. In one or more embodiments, a method for treating soil can include applying a partially oxidized reaction product to a soil. The partially oxidized reaction product can be prepared by decreasing a pH of a mixture that includes glycerol and fatty acids to produce a mixture that includes a glycerol-rich portion and a fatty acids-rich portion. The glycerol-rich portion can be reacted with at least one of an oxidant and a catalyst at conditions sufficient to produce the partially oxidized reaction product.

20 Claims, 2 Drawing Sheets

SYSTEMS AND METHODS FOR PROCESSING GLYCEROL

This is a national stage application of PCT Patent Application No. PCT/US2012/039744 filed May 25, 2012, which claims the benefit of U.S. Provisional Patent Application having Ser. No. 61/489,954, filed on May 25, 2011, which are both incorporated by reference herein.

BACKGROUND

1. Field

Embodiments described herein generally relate to systems and methods for processing glycerol and uses thereof. More particularly, such embodiments relate to reaction products produced by reacting a glycerol-containing feed with one or more acids, one or more oxidants, one or more catalysts, or any combination thereof and methods for making and using same.

2. Description of the Related Art

The level of biodiesel production, an alternative fuel source, has increased significantly in recent years. A byproduct derived from the biodiesel manufacturing process is glycerol, often referred to as "waste glycerol," "crude glycerol," or "raw glycerol." For every tonne (metric ton) of biodiesel made from vegetable oil, 100 kg of thick viscous glycerol is produced as a byproduct. Europe alone produces around 6.8 billion liters of biodiesel, which generates around 680,000 tonnes of waste glycerol every year. And the recent and rapid expansion in biodiesel production has resulted in a global oversupply of waste glycerol.

Although some of the waste glycerol is purified for pharmaceutical or food applications, the majority ends up as waste. Waste glycerol is typically incinerated, which is a less than optimal use for a low cost and readily available byproduct.

There is a need, therefore, for new methods for processing glycerol into one or more products and uses thereof.

SUMMARY

Systems and methods for processing glycerol into one or more products and uses thereof are provided. In one or more embodiments, a method for treating soil can include applying a partially oxidized reaction product to a soil. The partially oxidized reaction product can be prepared by decreasing a pH of a mixture that includes glycerol and fatty acids to produce a mixture that includes a glycerol-rich portion and a fatty acids-rich portion. The glycerol-rich portion can be reacted with at least one of an oxidant and a catalyst at conditions sufficient to produce the partially oxidized reaction product.

In one or more embodiments, a method for treating soil can include applying a reacted product to a soil. The reacted product can be prepared by decreasing a pH of a mixture that includes glycerol and fatty acids to produce a mixture that includes a glycerol-rich portion and a fatty acids-rich portion. The glycerol-rich portion can be reacted with an acid that includes phosphorus at conditions sufficient to produce the reacted product.

DETAILED DESCRIPTION

Figure 1:
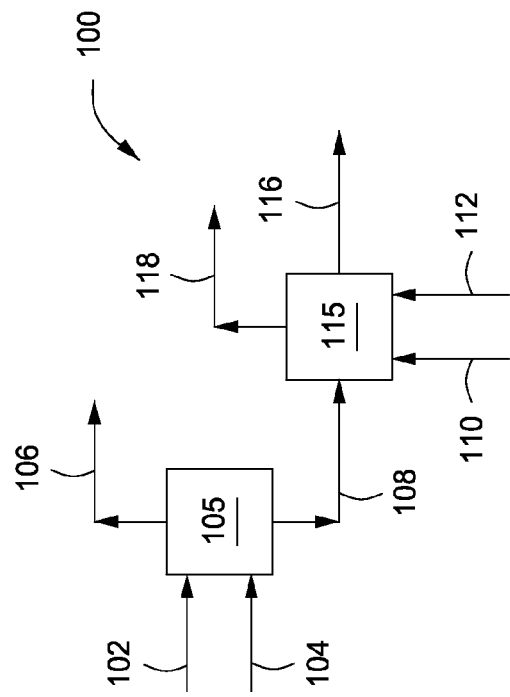
FIG. 1 depicts an illustrative system for processing glycerol, according to one or more embodiments described.

FIG. 1 depicts an illustrative system 100 for processing glycerol, according to one or more embodiments. A glycerol-containing feed via line 102 and an acid via line 104 can be introduced to one or more mixers 105, where the two components can be mixed, blended, or otherwise combined together to produce a mixture. The mixture can be allowed to separate within the mixer 105 into two or more fractions or portions, including a first portion or glycerol-lean portion and a second portion or glycerol-rich portion.

As used herein, the terms "glycerol-lean portion" and "fatty acids-rich portion" are used interchangeably to refer to a mixture or composition that has a greater concentration of fatty acids than glycerol. Similarly, the term "glycerol-rich portion" and "fatty acids-lean portion" are used interchangeably to refer to a mixture or composition that has a greater concentration of glycerol than fatty acids.

The first portion or glycerol-lean portion via line 106 and the second portion or glycerol-rich portion via line 108 can be recovered from the mixer 105. The recovered glycerol-rich portion via line 108 and an oxidant via line 110 can be introduced to one or more reactors 115 to produce a reacted product or a "partially oxidized reaction product" via line 116 and an off-gas via line 118. One or more catalysts via line 112 can be introduced to the reactor 115 in lieu of or in addition to the oxidant in line 110.

Figure 2:
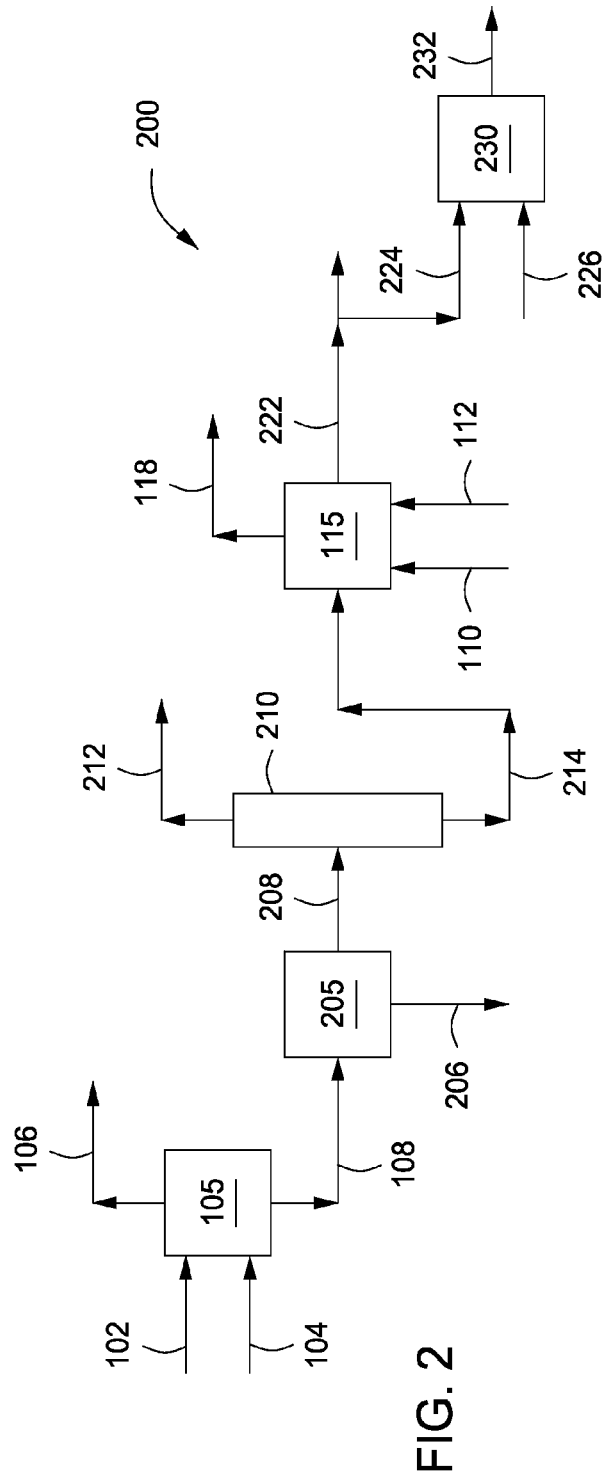
FIG. 2 depicts another illustrative system for processing glycerol, according to one or more embodiments described.

FIG. 2 depicts another illustrative system 200 for processing glycerol, according to one or more embodiments. The system 200 can include the mixer(s) 105 and reactor(s) 115 mentioned above and can further include one or more particulate separation units or filters 205 to remove solids, one or more separators 210 to remove methanol, and one or more additional mixers 230. As discussed above, the glycerol-containing feed via line 102 and the acid via line 104 can be introduced to the one or more mixers 105, where the two components can be mixed, blended, or otherwise combined together to produce a mixture and separated into at least two fractions or portions, e.g., a first portion or glycerol-lean portion via line 106 and a second portion or glycerol-rich portion via line 108.

If solids are present in the glycerol-rich portion, the glycerol-rich portion via line 108 can be introduced to the one or more particulate separation units or filters 205 to produce a solids-rich product via line 206 and a filtered glycerol-rich portion having a reduced concentration of solids via line 208 relative to the glycerol-rich portion in line 108. The particulate removal unit or filter 205 can be or include any device capable of separating at least a portion of any solids contained in the glycerol-rich portion in line 108. Illustrative filters can include, but are not limited to, rigid or flexible screens, pleated cartridges, melt blown cartridges, woven fabrics, nonwoven fabrics, sintered metals, granular media, membranes, centrifugal separators, bag filters, strainers, or any combination thereof. Screens can include wedge-wire screens, weave-wire screens such as square weave, Dutch Weave, and Double Dutch Weave, or any combination thereof. Membranes can include ceramic membranes, polymer membranes, or a combination thereof. The particulate removal unit 205 can separate particles having a size ranging from a low about 0.1 μm, about 0.5 μm, or about 1 μm to a high of about 3 μm, about 5 μm, about 10 μm, for example. The particulate removal unit 205 can remove from about 50% to about 100% of the solids contained in the glycerol-rich portion in line 108. For example, the particulate removal unit 205 can remove about 50%, about 60%, about 70%, about 80%, about 90%, or about 95% of the solids contained in the glycerol-rich portion in line 108.

The filtered glycerol-rich portion via line 208 can be introduced to the one or more separators 210, which can remove or otherwise separate methanol, if present, in the filtered glycerol-rich portion of line 208. Although not shown, in at least one embodiment, the glycerol-rich portion in line 106 can bypass the particulate removal unit 205 and be introduced to the one or more separators 210. Said another way, the particulate removal unit 205 can be optional. The separated methanol can be recovered via line 212 and a glycerol-rich portion having a reduced concentration of methanol can be removed via line 214. The glycerol-rich portion via line 214 and the oxidant via line 110 and/or the catalyst via line 112 can be introduced to the one or more reactors 115 to produce a reacted product ("first product" or "first partially oxidized reaction product") via line 222 and an off-gas via line 118. Although not shown, in at least one embodiment, the glycerol-rich portion in line 106 and/or the filtered glycerol-rich portion via line 208 can bypass the separator 210 and be introduced to the reactor 115. Said another way, the one or more separators 210 can be optional.

As a result of separating methanol within the separator 210, the concentration of formic acid in the reacted product of line 222 can be reduced relative to the concentration of formic acid in the reacted product of line 116 (FIG. 1) since formic acid is a reaction product from reacting methanol with the oxidant and/or catalyst in reactor 115. Therefore, removing at least a portion of any methanol, if present, in the glycerol-rich portion in line 208 can reduce the concentration of formic acid in the reacted product recovered via line 222 relative to the concentration of formic acid in the reacted product in line 116.

At least a portion of the reacted product in line 222 can be introduced via line 224 to the one or more additional mixers ("second mixer") 230 where one or more base compounds via line 226 can be mixed, blended, or otherwise combined with the product from line 224 to produce a second reacted product ("second product" or "second partially oxidized reaction product") via line 232. Combining the reacted product of line 224 with the base compound of line 226 can produce a second reacted product via line 232 having a higher pH (i.e., more alkaline) than the reacted product of line 116 (FIG. 1) and/or 222 (FIG. 2). A product with a pH in the range of about 5.5 to about 8.0 can be useful as a hydrate inhibitor, and can facilitate certain gas recovery, as described in more detail below.

Referring to FIGS. 1 and 2, the glycerol-containing feed in line 102 can include, but is not limited to, glycerol, monoglycerides, diglycerides, methanol, soaps of fatty acids, fatty acids, organic salts, inorganic salts, water, biodiesel, solids, or any combination thereof. The glycerol-containing feed in line 102 can come from any source, process, or any number of sources and/or processes. For example, the glycerol-containing feed via line 102 can be or include a byproduct from the production of biodiesel. In another example, the glycerol-containing feed can be or include a byproduct from the production of soaps, e.g., produced by the saponification of animal fats. In yet another example, the glycerol-containing feed in line 102 can include glycerol produced from the conversion of epichlorohydrin. In yet another example, the glycerol-containing feed in line 102 can be or include a byproduct from the refining of cooking and/or salad oils. In yet another example, the glycerol containing feed can be or include technical or USP Grade glycerol. The glycerol-containing feed of line 102 can bypass the mixer 105 and can be introduced directly to the reactor 115, if desired.

Depending, at least in part, on the source of origin, the glycerol-containing feed in line 102 can have a pH from a low of about 6, about 6.5, or about 7 to a high of about 8, about 9, about 11, or about 13. The glycerol-containing feed in line 102 can have a glycerol concentration ranging from about 1 wt % to about 99 wt %. The particular make-up or composition of the glycerol-containing feed in line 102 can widely vary. For example, in addition to the glycerol, the glycerol-containing feed in line 102 can also include from about 5 wt % to about 35 wt % methanol, from about 5 wt % to about 25 wt % water, from about 20 wt % to about 55 wt % fatty acids and/or soaps of fatty acids, and/or from about 0.5 wt % to about 10 wt % inorganic and/or organic salts. The fatty acids can include acyclic and/or aliphatic carboxylic acids. Such fatty acids can contain any where from 8 to 22 carbon atoms. With respect to carbon-carbon bonds, the fatty acids can be saturated, monounsaturated, or polyunsaturated. The organic salts can include, but are not limited to, sodium, lithium, salts of fatty acids, proteins, or any combination thereof. The inorganic salts can include, but are not limited to, sodium chloride (NaCl), potassium chloride (KCl), lithium chloride (LiCl), or any combination thereof. The solids can include, but are not limited to, fats, carbons, salts of fatty acids, polymers of fatty acids, or any combination thereof.

The glycerol-containing feed in line 102 can have a concentration of fatty acids from a low of about 0 w %, about 0.5 wt %, about 1 wt %, about 1.5 wt %, about 2 wt %, or about 3 wt % to a high of about 6 wt %, about 8 wt %, about 10 wt %, or about 12 wt %. The glycerol-containing feed in line 102 can have a concentration of methanol of about 0 wt %, about 1 wt %, about 3 wt %, about 5 wt %, or about 8 wt % to a high of about 17 wt %, about 20 wt %, about 25 wt %, about 30 wt %, or about 35 wt %. The glycerol-containing feed in line 102 can have a concentration of salts from a low of about 0 wt %, about 0.5 wt %, about 1 wt %, about 1.5 wt %, or about 2 wt % to a high of about 4 wt %, about 5 wt %, about 6 wt %, about 7 wt %, or about 8 wt %. The glycerol-containing feed in line 102 can have a concentration of water from a low of about 3 wt %, about 5 wt %, about 8 wt %, or about 10 wt % to a high of about 20 wt %, about 23 wt %, about 27 wt %, about 30 wt %, or about 35 wt %. The glycerol-containing feed in line 102 can have a concentration of glycerol from a low of about 30 wt %, about 40 wt %, about 45 wt %, about 50 wt %, about 55 wt %, or about 60 wt % to a high of about 75 wt %, about 80 wt %, about 85 wt %, about 90 wt %, or about 95 wt %. In at least one specific embodiment, the glycerol-containing feed in line 102 can have from about 1 wt % to about 10 wt % fatty acids, from about 5 wt % to about 30 wt % methanol, from about 2 wt % to about 6 wt % salts, from about 5 wt % to about 30% water, and from about 40 wt % to about 80 wt % glycerol. The glycerol-containing feed in line 102 can also include one or more amino acids, one or more sugars, one or more lignins, one or more phosphoglycolipids, or any combination thereof.

The acid in line 104 can be or include any acid or combination of two or more acids. For example, the acid in line 104 can be or include one or more mineral acids, sulfonic acids, carboxylic acids, or any combination thereof. Illustrative mineral acids can include, but are not limited to, hydrochloric acid (HCl), hydrobromic acid (HBr), hydroiodic acid (HI), hypochloric acid, chloric acid, perchloric acid, periodic acid, sulfuric acid ($H_2SO_4$), fluorosulfuric acid ($FSO_3H$), nitric acid ($HNO_3$), phosphoric acid ($H_3PO_4$), fluoroantimonic acid ($HSbF_6$), fluoroboric acid ($HBF_4$), hexafluorophosphoric acid ($HPF_6$), and chromic acid ($H_2CrO_4$). Illustrative sulfonic acids can include, but are not limited to, methanesulfonic acid (MeSO$_3$H), ethanesulfonic acid (EtSO$_3$H), benzenesulfonic acid (C$_6$H$_5$SO$_3$H), p-Toluenesulfonic acid (CH$_3$C$_6$H$_4$SO$_3$H), and trifluoromethanesulfonic acid (CF$_3$SO$_3$H). Illustrative carboxylic acids can include, but are not limited to, acetic acid (C$_2$H$_4$O$_2$), citric acid (C$_6$H$_8$O$_7$), formic acid (CH$_2$O$_2$), gluconic acid (C$_6$H$_{12}$O$_7$), lactic acid (C$_3$H$_6$O$_3$), oxalic acid (C$_2$H$_2$O$_4$), and tartaric acid (C$_4$H$_6$O$_6$). If the acid in line 104 includes carboxylic acid(s), the number of carbon atoms in the carboxylic acid(s) is preferably less than 8, or less than 7, or less than 6. In at least one specific embodiment, the acid in line 104 can be an acid other than a fatty acid. In at least one specific embodiment, the acid or combination of acids in line 104 is not a carboxylic acid. In at least one specific embodiment, the acid or combination of acids in line 104 is not a fatty acid.

The acid in line 104 can be introduced to the mixer 105 in an amount sufficient to produce a mixture therein having a pH of less than about 5.5, less than about 5, less than about 4.5, or less than about 4. For example, the pH of the mixture can range from a low of about 2.5, about 3, or about 3.5 to a high of about 4, about 4.5, or about 5. The particular amount and/or type of acid added to the mixer 105 can depend, at least in part, on the amount of the glycerol or the fatty acids in the glycerol-containing feed and the pH of the feed. For example, 1 to 100 moles of acid can be added per mole of glycerol-containing feed to meet the desired pH of the resulting mixture. The amount of acid added to the glycerol-containing feed can also range anywhere from about 1:1 to about 90:1; about 5:1 to about 75:1; or about 10:1 to about 20:1, on a volume basis.

The mixer 105, can be any device or system suitable for batch, intermittent, and/or continuous mixing, blending, or otherwise combining of two or more components. For example, the mixer 105 can be any device or system suitable for mixing the glycerol-containing feed in line 102 and the acid in line 104. The mixer 105, can be capable of producing a homogenized mixture. Illustrative mixers can include, but are not limited to, mechanical mixer agitation, ejectors, static mixers, mechanical/power mixers, shear mixers, sonic mixers, or combinations thereof. The mixer 105, can include one or more heating jackets, heating coils, internal heating elements, or the like, to regulate the temperature therein.

Decreasing the pH of the glycerol-containing feed in line 102 by mixing, blending, or otherwise combining the one or more acids of line 104 therewith can facilitate, cause, or otherwise promote separation of the glycerol from the glycerol-containing feed. The glycerol-containing feed via line 102 and the acid via line 104 can be combined within the mixer 105 to produce a mixture that can include the glycerol-rich portion and the glycerol-lean portion. The lower pH can form a first layer or "glycerol-lean portion" and a second layer or "glycerol-rich portion." The first layer or glycerol-lean portion and/or the second layer or glycerol-rich portion can be in the form of an emulsion, e.g., hydrocarbon-in-water emulsion. The first layer or glycerol-lean portion and/or the second layer or glycerol-rich portion can be in the form of a suspension or dispersion, e.g., hydrocarbon suspended or dispersed in water. The first layer can also be referred to as a "fatty acids-rich portion," and can include the fatty acids, soaps of fatty acids, and/or biodiesel from the glycerol-containing feed. The glycerol-rich portion can include the glycerol, monoglycerides, diglycerides, methanol, organic salts, inorganic salts, and/or water from the glycerol-containing feed.

In one or more embodiments, the mixture of the glycerol-containing feed and the acid in the mixer 105 can be heated to accelerate the combining and separation process. For example, the mixture can be heated to a temperature of about 40° C., about 50° C., about 55° C., about 60° C., or about 65° C. If methanol is present and it is desirable to maintain methanol in the glycerol-rich portion of line 108, the temperature can be maintained below about 64.7° C., which is the boiling point of methanol. In at least one specific embodiment, the mixture can be heated to a temperature greater than about 65° C., to vaporize at least a portion of the methanol, if present, in the glycerol-containing feed in line 102. As such, if the glycerol-containing feed includes methanol, the methanol can either be recovered as a separate product or the methanol can remain in the glycerol-rich portion recovered via line 108 by regulating the temperature of the mixer 105. Although not shown, methanol can be recovered or separated from the feed 102 prior to the mixer 105 to produce a methanol-lean glycerol-containing feed in line 102.

The glycerol-rich portion in line 108 can have a glycerol concentration ranging from a low of about 30 wt %, about 40 wt %, or about 45 wt % to a high of about 55 wt %, about 60 wt %, about 65 wt %, about 75 wt %, about 85 wt %, or about 95 wt %. The glycerol-rich portion in line 108 can have a methanol concentration ranging from a low of about 1 wt %, about 5 wt %, or about 10 wt % to a high of about 25 wt %, about 30 wt %, or about 35 wt %. The glycerol-rich portion in line 108 can have a water concentration ranging from a low of about 5 wt %, about 10 wt %, or about 12 wt % to a high of about 15 wt %, about 20 wt %, or about 25 wt %. The glycerol-rich portion in line 108 can have a salt concentration ranging from a low of about 0.5 wt %, about 1 wt %, or about 2 wt % to a high of about 5 wt %, about 7 wt %, or about 9 wt %. The glycerol-rich portion in line 108 can have a solids concentration ranging from a low of about 0.5 wt %, about 1 wt %, or about 3 wt % to a high of about 5 wt %, about 10 wt %, or about 15 wt %. The glycerol-rich portion in line 108 can also include residual or trace amounts, e.g., less than about 1 wt %, less than about 0.5 wt %, less than about 0.3 wt %, or less than about 0.1 wt %, of monoglycerides, proteins, amino acids, and/or gums, for example. The glycerol-rich portion in line 108 can have a fatty acids concentration of less than about 15 wt %, less than about 10 wt %, less than about 5 wt %, less than about 3 wt %, less than about 1 wt %, or less than about 0.5 wt %.

The oxidant in line 110 can include one or more oxidants including, but not limited to, hydrogen peroxide (H$_2$O$_2$), oxygen (O$_2$), ozone (O$_3$), oxygen-containing gases, e.g., air, sodium permanganate, potassium permanganate, sodium persulfate, potassium persulfate, magnesium peroxide, calcium peroxide, sodium percarbonate, or any combinations thereof. The amount of oxidant introduced via line 110 to the reactor 115 can vary, but should be sufficient to at least partially oxidize the glycerol-rich portion introduced via line 108. The amount of oxidant can depend, at least in part, on the amount of the glycerol in the reactor 115 and/or the particular composition or make-up of the glycerol in line 108. In one or more embodiments, the amount of the oxidant introduced via line 110 can be based on the number of moles of oxidant per mole of glycerol and can range from a low of about 0.2 mol %, about 0.4 mol %, about 0.5 mol %, or about 0.8 mol % to a high of about 1 mol %, about 1.2 mol %, about 1.5 mol %, or about 2 mol %.

The reactor 115 can be any container or environment suitable for batch, intermittent, and/or continuous contact of the glycerol-rich portion of line 108 with the oxidant of line 110 and/or the catalyst of line 112. In one or more embodiments, the reactor 115 can be an open vessel or a closed vessel. In one or more embodiments, the reactor 115 can include one or more mixing devices such as one or more mechanical/power mixers and/or sonic mixers. In one or more embodiments, the reactor 115 can include a cooling jacket and/or coil for maintaining a temperature of the reaction mixture at a predetermined temperature. The reactor 115 can include one or more nozzles, fluid distribution grids, or other device(s) for introducing the oxidant to the reactor 110.

Within the reactor 115, at least a portion of the glycerol can react with the oxidant at conditions sufficient to produce glyceric acid, oxalic acid, glycolic acid, formic acid, glyceraldehydes, hydroxypyruvic acid, tartronic acid, derivatives thereof, or any combination thereof. In one or more embodiments, at least a portion of the methanol, if present, can react with the oxidant at conditions sufficient to produce formic acid. Suitable conditions can include a temperature of about 70° C. or less, about 65° C. or less, about 60° C. or less, or about 55° C. or less. The reaction temperature can also range from a low of about 0° C., about 15° C., or about 20° C. to a high of about 50° C., about 65° C., or about 75° C., although higher temperatures are envisaged.

The one or more catalysts via line 112 can be introduced to the reactor 115, in addition to or in lieu of the oxidant via line 110, to produce the reacted product via line 116. Suitable catalysts can include, but are not limited to, platinum, palladium, carbon supported platinum, potassium permanganate, chromium oxide, carbon supported palladium, silicates, aluminophosphates, or any combination thereof. In at least one specific embodiment, hydrogen peroxide via line 110 and/or a catalyst, e.g., ferrous sulfate and/or potassium permanganate, via line 112 can be introduced to the reactor 115.

The composition or make-up of the reacted product in line 116 can widely vary. The amount of oxidant and/or catalyst, residence time, temperature, pressure, and other process variables can influence the particular products and the relative amounts of those particular products produced. For example, increasing the temperature of the reaction mixture can increase the amount of acids, e.g., carboxylic acids, produced in the reactor 115 and contained in the reacted product in line 116. In another example, increasing the amount of oxidant, relative to the amount of the glycerol-rich portion, can increase the amount of acids, e.g., carboxylic acids, produced in the reactor 115 and contained in the reacted product in line 116.

The reacted product in line 116 can have a concentration of glyceric acid ranging from a low of about 1 wt %, about 10 wt %, or about 20 wt % to a high of 50 wt %, about 60 wt %, about 70 wt %, about 80 wt %, or about 100 wt %. The reacted product in line 116 can also have a concentration of oxalic acid ranging from a low of about 0.1 wt %, about 1 wt %, or about 3 wt % to a high of about 5 wt %, about 7 wt %, or about 10 wt %. The reacted product in line 116 can also have a concentration of glycolic acid ranging from a low of about 0.1 wt %, about 0.5 wt %, or about 1 wt % to a high of about 1.5 wt %, about 2 wt %, or about 3 wt %. The reacted product in line 116 can also have a concentration of formic acid ranging from a low of about 1 wt %, about 5 wt %, or about 10 wt % to a high of about 20 wt %, about 30 wt %, or about 40 wt %. The reacted product in line 116 can also have a concentration of glyceraldehydes ranging from a low of about 0.1 wt %, about 0.5 wt %, or about 1 wt % to a high of about 1.5 wt %, about 2 wt %, or about 3 wt %. The reacted product in line 116 can also have a concentration of hydroxypyruvic acid ranging from a low of about 0.1 wt %, about 1 wt %, or about 1.5 wt % to a high of about 3 wt %, about 5 wt %, or about 7 wt %. The reacted product in line 116 can also have a concentration of tartronic acid ranging from a low of about 0.1 wt %, about 0.5 wt %, or about 1 wt % to a high of about 1.5 wt %, about 2 wt %, or about 3 wt %. The reacted product in line 116 can also have a concentration of water ranging from a low of about 1 wt %, about 5 wt %, or about 10 wt % to a high of about 30 wt %, about 40 wt %, or about 50 wt %. The reacted product in line 116 can also have a concentration of solids ranging from a low of about 0.1 wt %, about 0.5 wt %, or about 1 wt % to a high of about 1.5 wt %, about 2 wt %, or about 3 wt %. The reacted product in line 116 can also have a concentration of glycerol ranging from a low of about 0.1 wt %, about 5 wt %, or about 10 wt % to a high of about 20 wt %, about 30 wt %, or about 40 wt %. The reacted product in line 116 can also have a concentration of methanol ranging from a low of about 0.1 wt %, about 1 wt %, or about 3 wt % to a high of about 5 wt %, about 7 wt %, or about 10 wt %. In at least one example, the reacted product or first partially oxidized reaction product in line 116 can include about 1 wt % to about 80 wt % glyceric acid, about 0.1 wt % to about 10 wt % oxalic acid, about 0.1 wt % to about 3 wt % glycolic acid, and about 1 wt % to about 40 wt % formic acid.

In at least one specific embodiment, the reacted product in line 116 can be free from or substantially free from any glycols, mono alkyl ethers, and/or ethylenediaminetetracetic acid (EDTA). For example, the reacted product in line 116 can contain less than about 1 wt %, less than about 0.7 wt %, less than about 0.5 wt %, less than about 0.3 wt %, less than about 0.1 wt %, less than about 0.07 wt %, less than about 0.05 wt %, less than about 0.03 wt %, or less than about 0.01 wt % of any glycol. In another example, the reacted product in line 116 can contain less than about 1 wt %, less than about 0.7 wt %, less than about 0.5 wt %, less than about 0.3 wt %, less than about 0.1 wt %, less than about 0.07 wt %, less than about 0.05 wt %, less than about 0.03 wt %, or less than about 0.01 wt % of any mono alkyl ethers. In another example, the reacted product in line 116 can contain less than about 1 wt %, less than about 0.7 wt %, less than about 0.5 wt %, less than about 0.3 wt %, less than about 0.1 wt %, less than about 0.07 wt %, less than about 0.05 wt %, less than about 0.03 wt %, or less than about 0.01 wt % EDTA. In another example, the reacted product in line 116 can contain less than about 1 wt %, less than about 0.7 wt %, less than about 0.5 wt %, less than about 0.3 wt %, less than about 0.1 wt %, less than about 0.07 wt %, less than about 0.05 wt %, less than about 0.03 wt %, or less than about 0.01 wt % of a combined amount of any glycols, mono alkyl ethers, and EDTA.

Considering the separator 210 of FIG. 2 in more detail, the separator 210 can be empty, partially filled, or completely filled with one or more trays and/or packing to improve mass transfer and/or separation of a multi-component fluid. Illustrative trays can include, but are not limited to, perforated trays, sieve trays, bubble cap trays, floating valve trays, fixed valve trays, tunnel trays, cartridge trays, dual flow trays, baffle trays, shower deck trays, disc and donut trays, orbit trays, horse shoe trays, cartridge trays, snap-in valve trays, chimney trays, slit trays, or any combination thereof.

The packing can increase the effective surface area, which can improve the mass transfer therein. Suitable packing can include, but is not limited to, metals, non-metals, polymers, ceramics, glasses, or any combination thereof. The packing can be structured and/or random. Suitable structured packing can include Raschig rings, Lessing rings, I-rings, saddle rings, Berl saddles, Intalox saddles, Tellerettes, Pall rings, U-rings, or any combination thereof. Illustrative examples of commercially available structured packing can include, but is not limited to FLEXIPAC® and GEMPAK® structured packing as manufactured by the Koch-Glitsch Corporation, corrugated sheets, crimped sheets, gauzes, grids, wire mesh, monolith honeycomb structures, or any combination thereof.

The separator 210 can be used to separate at least a portion of the methanol, if present, in the glycerol-rich portion in line 208 to provide the methanol via line 212 and the glycerol-rich portion via line 214. The separated glycerol-rich portion via line 214 can have a reduced concentration of methanol relative to the glycerol-rich portion in line 208. The separator 210 can include any number of separation processes, for example, evaporation, fractionation, and/or distillation. In one or more embodiments, all or a portion of the methanol contained in the glycerol-rich portion in line 208 can be separated and recovered via line 212. As such, the glycerol-rich portion recovered via line 214 can include less than about 30 wt %, less than about 20 wt %, less than about 10 wt %, less than about 5 wt %, less than about 2 wt %, less than about 1 wt %, less than about 0.5 wt %, or less than about 0.1 wt % methanol.

The base compound of line 226 that is added to mixer(s) 230 can be or include any base or combination of two or more bases. Illustrative bases or base compounds can include, but are not limited to, potassium hydroxide (KOH), sodium hydroxide (NaOH), lithium hydroxide (LiOH), amines, or any combination thereof. Suitable amines can include, but are not limited to, alkanolamines, polyamines, aromatic amines, and any combination thereof. Illustrative alkanolamines can include, but are not limited to, monoethanolamine (MEA), diethanolamine (DEA), triethanolamine (TEA), or any combination thereof. Illustrative aromatic amines can include, but are not limited to, benzyl amine, aniline, ortho toludine, meta toludine, para toludine, n-methyl aniline, N—N'-dimethyl aniline, di- and tri-phenyl amines, 1-naphthylamine, 2-naphthylamine, 4-aminophenol, 3-aminophenol and 2-aminophenol. Illustrative polyamines can include, but are not limited to, diethylenetriamine (DETA), triethylenetetramine (TETA), tetraethylenepentamine (TEPA) 1,3-propanediamine, 1,4-butanediamine, polyamidoamines, and polyethylenimines.

The particular amount of the base compound added can depend, at least in part, on the amount of the particular composition or make-up of the reacted product, i.e., the particular components and the relative amount of those components contained in the reacted product of line 224. In one or more embodiments, the base compound in line 226 can be introduced to the second mixer 230 in an amount sufficient to produce a mixture therein having a pH of about 6 or more, about 6.5 or more, about 7 or more, about 7.5 or more, about 8 or more, about 8.5 or more. For example, the pH of the mixture within the second mixer 230 can range from a low of about 6, about 6.5, or about 7 to a high of about 8, about 8.5, or about 9. In another example, about 1 to about 100 moles of base can be added per mole of reacted product to meet the desired pH of the resulting mixture in line 232. The amount of base added to the reacted product can also range anywhere from about 1:1 to about 90:1, about 5:1 to about 75:1, or about 10:1 to about 20:1, on a volume basis.

The reacted products, i.e., the reacted product in lines 116, 222, and/or the second reacted product in line 232, can have a flash point greater than about 30° C., greater than about 38° C., greater than about 50° C., greater than about 66° C., or greater than about 93° C. and less than about 300° C., less than about 250° C., or less than about 200° C. For example, the reacted products can have a flash point of about 32° C., about 54° C., about 60° C., about 68° C., about 75° C., or about 95° C. The reacted products can have a freezing point of less than about −25° C., less than about −50° C., less than about −60° C., or less than about −65° C.

The reacted products can also have a specific gravity, relative to demineralized water, ranging from a low of about 1.05, about 1.09, or about 1.15 to a high of about 1.3, about 1.4, or about 1.5. For example, the reacted products can have a specific gravity, with respect to demineralized water, of about 1.1, about 1.2, about 1.25, or about 1.3.

The reacted products can also have a pH of less than about 3.5, less than about 3, less than about 2.5, less than about 2, less than about 1.5, or less than about 1. The pH of the reacted products can also range from a low of about 1, about 1.3, about 1.7, or about 2.1 to a high of about 3, about 3.3, about 3.6, or about 3.9.

The reacted products, i.e., the reacted product of lines 116, 222, and/or the second reacted product of line 232, can be mixed or blended with corrosion inhibitors, polymers, salts, scale removers, surfactants, inhibitors, or any combination thereof and can be used in any number of applications. Illustrative corrosion inhibitors can include, but are not limited to, filmers, neutralizers, or a combination thereof. Illustrative polymers can include, but are not limited to, polyols, polyamides, poly celluloses, poly(acrylic acids), or any combination thereof. Illustrative salts can include, but are not limited to, NaCl, KCl, LiCl, trisodium phosphate (TSP), sodium tripolyphosphate or sodium triphosphate (STPD or STP), tripotassium phosphate (TKPP), potassium triphosphate (KTP), or any combination thereof.

In one or more embodiments, the reacted products of lines 116, 222, and/or 232 can act or work as an acid, a sequestrant, a chelant, a dispersing agent, a solvent, or any combination thereof for removing mineral scale deposits (scale). The formation of scales can be caused by a number of factors, which can include, but are not limited to, pressure drops, temperature fluctuations, changes in pH or ionic strength, and any combinations thereof. The formation or precipitation of scale deposits can occur in, for example, oil production and/or processing equipment, which can be located above and/or below the surface. The formation or precipitation of scale deposits can also occur in subterranean formations, such as an oil and/or gas producing formations. Oil production and processing equipment can include, flow lines, heaters, pumps, valves, pipes, pipelines, risers, drill strings, wellbores, downhole pumps, perforations, fractures, fissures, and the like. Other areas in which scale deposits can be problematic include, but are not limited to, the chemical processing industries, public utilities, and other processes in which mineral-laden water is processed or used, as in heat exchangers, storage vessels, piping, reactors, evaporators, and the like. Commonly encountered scales include, but are not limited to, calcium carbonate ($CaCO_3$), calcium sulfate ($CaSO_4$), barium sulfate ($BaSO_4$); and sodium chloride (NaCl). Other inorganic mineral deposits can include, strontium sulfate ($SrSO_4$), strontium carbonate ($SrCO_3$), iron oxide ($Fe_2O_3$), iron carbonate ($FeCO_3$), iron sulfide (FeS), barium-strontium sulfate ($BaSr(SO_4)_2$), magnesium carbonate ($MgCO_3$), magnesium sulfate ($MgSO_4$), or any combination thereof.

Introducing the reacted products in lines 116, 222, and/or 232 to equipment, formations, and/or other locations where scale deposits form or can potentially form can reduce scale and/or inhibit or prevent the formation of scale. The reacted products, at any desired concentration, can be used to remove scale and/or prevent or reduce the formation of scale. In one or more embodiments, the reacted products in lines 116, 222, and/or 232 can be diluted with water to provide an aqueous solution having a desired concentration.

In one or more embodiments, the reacted products in lines 116, 222, and/or 232 can be used to demulsify an emulsion. The reacted products, for example, can demulsify an emulsion by lowering the pH of the emulsion and/or by increasing the specific gravity of the produced water. The emulsion can be or include any two or more immiscible or substantially immiscible liquids. For example, the emulsion can be an oil in water emulsion, i.e., an emulsion that contains more oil than water based on weight. In another example, the emulsion can be a water in oil emulsion, i.e., an emulsion that contains more water than oil based on weight. The reacted products can be used as produced, diluted, and/or mixed with other ingredients that can improve the demulsification. Illustrative additional ingredients can include, but are not limited to, silicon compounds, glycols, salts, any other water soluble demulsifiers, or any combination thereof.

In one or more embodiments, the reacted products in lines 116, 222, and/or 232 can be used as a frac fluid, drilling fluid, or component thereof for oil and/or gas production. The reacted products in lines 116, 222, and/or 232 can be used neat or mixed or blended with one or more other fluids. An illustrative frac fluid, for example, can include about 5 wt % to about 25 wt % reacted product, about 5 wt % to about 25 wt % formic acid, and about 45 wt % to about 65 wt % water. Illustrative blending agents and/or additives can include, but are not limited to, drilling fluids, steam, corrosion inhibitors, water, acids such as hydrochloric acid, surfactants, polymers such as polyols, polyamides, poly celluloses, poly(acrylic acids), or any combination thereof. For drilling, the reacted product is particularly useful in water-based drilling fluids.

In one or more embodiments, the reacted products in lines 116, 222, and/or 232 can be used as an anti-icing compound. The reacted products can be used neat, diluted with water, and/or or blended with one or more additives. In at least one specific embodiment, the anti-icing compound can be sprayed, injected, or otherwise introduced on, in, or to pipelines, processing equipment, diluents for chemicals, storage tanks, ships, oil rigs, trucks, airplanes, roads, automobiles, machinery, and storage equipment, for example. In at least one other specific embodiment, the anti-icing compound can be sprayed, injected, or otherwise introduced into pipelines or other fluid conveying structures, processing equipment, and storage tanks, for example. The anti-icing compound can be mixed or otherwise combined with one or more fluids flowing through pipelines or other fluid conveying structures, fluids processed within processing equipment, and/or fluids stored within storage tanks. The amount of anti-icing compound introduced to a pipeline, storage tank, and/or mixed with fluids processed in processing equipment, stored in storage tanks, and/or transported through pipelines or other fluid conveying structures can range from a low of about 0.001 wt %, about 0.01 wt %, about 0.1 wt %, or about 0.5 wt % to a high of about 1 wt %, about 3 wt %, about 5 wt %, about 10 wt %, or about 20 wt %, based on a combined weight of the fluids stored and/or transported and/or processed therein and the anti-icing compound. In another example, the amount of anti-icing compound, i.e., the reacted product in line(s) 116, 122, and/or 232, introduced to a pipeline, storage tank, and/or mixed with fluids processed in processing equipment, stored in storage tanks, and/or transported through pipelines or other fluid conveying structures can range from a about 0.001 wt % to about 30 wt %, about 0.01 wt % to about 25 wt %, about 0.1 wt % to about 20 wt %, about 0.5 wt % to about 15 wt %, about 1 wt % to about 13 wt %, about 3 wt % to about 11 wt %, or about 5 wt % to about 10 wt %, based on the combined weight of the fluids stored and/or transported and/or processed therein and the anti-icing compound. In yet another example, the amount of anti-icing compound, i.e., the reacted product in line(s) 116, 122, and/or 232, introduced to a pipeline, storage tank, and/or mixed with fluids processed in processing equipment, stored in storage tanks, and/or transported through pipelines or other fluid conveying structures can range from a about 10 wt % to about 30 wt %, about 7 wt % to about 20 wt %, about 10 wt % to about 15 wt %, about 5 wt % to about 10 wt %, about 7 wt % to about 13 wt %, about 10 wt % to about 20 wt %, or about 15 wt % to about 30 wt %, based on the combined weight of the fluids stored and/or transported and/or processed therein and the anti-icing compound.

The presence of the anti-icing compound can prevent, reduce, and/or inhibit the formation of ice on, within, or about one or more structures. For example, the anti-icing compound can prevent, reduce, and/or inhibit the formation of ice within one or more fluids prone to icing. The particular amount of anti-icing compound used for any given application can depend, at least in part, on one or more variables such as the particular fluid(s) combined therewith, structure(s) applied thereon, thereto, and/or thereabout, and/or structure(s) introduced thereto and/or fluid(s) present within those structures.

In one or more embodiments, the reacted products in lines 116, 222, and/or 232 can be used as a general purpose cleaner. As a general purpose cleaner, the reacted products can be used neat, diluted with water, and/or blended with one or more additives. Suitable additives can include, but are not limited to, polymers, salts, and/or other treatment chemicals that can expand or enhance one or more functional properties of the reacted products. In at least one specific embodiment, the reacted products can be diluted with water to provide a cleaning solution having a concentration of the reacted product ranging from about 100 ppmw to about 40 wt %. At least one specific application for the reacted products in lines 116, 222, and/or 232 can be to remove scale and/or other build-up on toilets, sinks, bath tubs, showers, faucets, nozzles, and the like.

In one or more embodiments, the reacted products in lines 116, 222, and/or 232 can be used as a drain cleaner. For example, one or more of the products in lines 116, 222, and/or 232 can be introduced to a clogged drain or other clogged conduit. The one or more of the products in lines 116, 222, and/or 232 can be allowed to react, dissolve, loosen, or otherwise affect the clog such that the drain or other conduit allows fluid to flow therethrough with a reduced resistance to flow as compared to before introducing the one or more of the products in lines 116, 222, and/or 232 thereto.

In one or more embodiments, the reacted products in lines 116, 222, and/or 232 can be used to prevent or reduce the formation of hydrates in a fluid containing one or more hydrate-forming constituents by contacting the fluid with the reacted product(s). For example, the second reacted product via line 232 can be introduced to a fluid or system that contains hydrates or in which hydrates can potentially form, e.g., a hydrocarbon gas stream containing methane and/or natural gas. Illustrative systems can include, but are not limited to, hydrocarbon production/processing equipment, pipelines, storage tanks, and the like. In at least one specific embodiment, the reacted products can be introduced into a downhole location such as a hydrocarbon production well to control hydrate formation in fluids produced therefrom. In another example, the reacted products can be introduced to a produced hydrocarbon at a wellhead location or into a riser through which produced hydrocarbons are transported in offshore operations from the ocean floor to an offshore production facility. In still another example, the reacted products can be introduced to a hydrocarbon prior to transporting the hydrocarbon, for example, via a subsea pipeline from an offshore production facility to an onshore gathering and/or processing facility. In one or more embodiments, the reacted products can be introduced to a downhole location as a drilling fluid or as a component of a drilling fluid.

In one or more embodiments, the reacted products in lines 116, 222, and/or 232 can be used to recover a gas that is bound or entrained in a formed hydrate. In at least one specific embodiment, the second reacted product via line 232 can be introduced into a downhole location or any other location that contains or may contain hydrates where the second reacted product can release at least a portion of any gases bound or contained in the hydrate(s) present therein. The released gases bound in the hydrate(s) can be recovered as a product.

A mixture that can potentially form or contain hydrates can include, for example a water and gas mixture. The gas can be a hydrocarbon normally gaseous at 25° C. and 100 kPa, such as an alkane of 1-4 carbon atoms, e.g., methane, ethane, propane, n-butane, isobutane, or an alkene of 2-4 carbon atoms, e.g., ethylene, propylene, n-butene, isobutene, or any combination thereof. The gas can include about 80 wt %, about 90 wt %, or more methane. The gas can also include about 0.1 wt % to about 10 wt % $C_2$ hydrocarbons and about 0.01 wt % to about 10 wt % $C_3$ hydrocarbons.

In one or more embodiments, the reacted products in lines 116, 222, and/or 232 can be used to remove existing corrosion within a system. In one or more embodiments, the reacted products in lines 116, 222, and/or 232 can be used to reduce or prevent corrosion within a system. For example, the reacted products in lines 116, 222, and/or 232 can be used to reduce or prevent corrosion within a pipeline or riser. The reacted products in lines 116, 222, and/or 232 can deposit or otherwise form a protective layer on a metal surface that can reduce or prevent corrosion of the metal surface.

In one or more embodiments, the reacted products in lines 116, 222, and/or 232 can be used to unswell or otherwise reduce the size of clay and/or polymer particles that have been introduced to a formation. Illustrative clays that can be unswelled with the reacted products in lines 116, 222, and/or 232 can include, but are not limited to, chlorite clays, illite clays, kaolinite clays, smectite clays such as montomorillonite, bentonite clays such as sodium bentonite, calcium bentonite, and potassium bentonite, or any combination thereof. Illustrative polymers that can be unswelled with the reacted products in lines 116, 222, and/or 232 can include, but are not limited to, polyacrylic acid (PAA), polymethacrylic acid (PMA), poly maleic anhydride, polyvinyl alcohol (PVOH), polyamides, low-viscosity latex, or any combination thereof. Other polymers that can be unswelled with the reacted products in lines 116, 222, and/or 232 can include polyethylene oxide, polypropylene oxide; polyoxymethylene, polyvinyl methyl ether, polyethylene imide, polyvinyl alcohol, polyvinyl pyrrolidone, polyethyleneimine, polyethylene sulfonic acid, polysilicic acid, polyphosphoric acid, polystyrene sulfonic acid, polyvinylamine, natural water soluble polymers, guar derivatives, cellulose derivatives, xanthan, chitosan, diutan, any suitable copolymers, or mixtures thereof. The reacted products in lines 116, 222, and/or 232 can reduce the volume or size of a swelled clay and/or polymer particle by about 2%, about 4%, about 6%, about 8%, about 10%, about 12%, about 14%, about 16%, about 18%, or about 20%.

Figure 3:
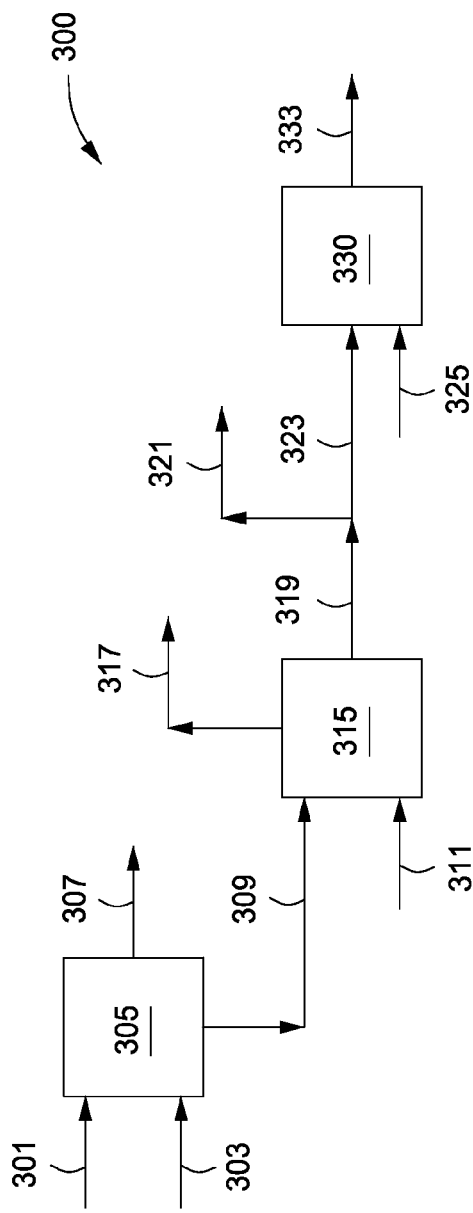
FIG. 3 depicts an illustrative system for processing glycerol, according to one or more embodiments described.

FIG. 3 depicts an illustrative system 300 for processing glycerol, according to one or more embodiments. A glycerol-containing feed via line 301 and an acid via line 303 can be introduced to one or more mixers 305, where the two components can be mixed, blended, contacted, or otherwise combined together to produce a mixture. As discussed and described above with reference to FIGS. 1 and 2, the mixture can be allowed to separate within the mixer 305 into two or more fractions or portions, including a first portion or glycerol-lean portion and a second portion or glycerol-rich portion.

The mixture can be heated to accelerate the separation of the mixture into the two or more fractions or portions. For example, the mixture can be heated to a temperature from a low of about 25° C., about 28° C., or about 30° C. to a high of about 35° C., about 38° C., or about 41° C. In another example, the mixture can be heated to a temperature of about 40° C., about 50° C., about 55° C., about 60° C., or about 65° C.

The glycerol-containing feed in line 301 can be the same or similar to the glycerol-containing-feed in line 102 discussed and described above with reference to FIGS. 1 and 2. For example, the glycerol-containing feed in line 301 can include, but is not limited to, glycerol, monoglycerides, diglycerides, methanol, soaps of fatty acids, fatty acids, organic salts, inorganic salts, water, biodiesel, solids, byproducts from the production of biodiesel, byproduct from the production of soaps, glycerol produced from the conversion of epichlorohydrin, byproducts from the refilling of cooking and salad oils, USP grade glycerol, or any combination thereof. The glycerol-containing feed in line 301 can also have the same or similar composition as the glycerol-containing feed in line 102.

The acid in line 303 can be or include any acid or combination of two or more acids. The acid in line 303 can be or include one or more phosphorus-containing acids. For example, the acid in line 303 can be or include one or more phosphoric acids, derivatives thereof, or any combination thereof. In another example, the acid in line 303 can be or include one or more mineral acids, one or more sulfonic acids, one or more carboxylic acids, or any combination thereof. In yet another example, the acid in line 303 can be or include one or more phosphorus-containing acids, one or more mineral acids, one or more sulfonic acids, one or more carboxylic acids, or any combination thereof.

Illustrative phosphoric acids can include, but are not limited to, orthophosphoric acid ($H_3PO_4$), polyphosphoric acids such as pyrophosphoric acid ($H_4P_2O_7$), tripolyphosphoric acid ($H_5P_3O_{10}$), and tetrapolyphosphoric acid ($H_6P_4O_{13}$), metaphosphoric acids such as trimetaphosphoric acid ($H_3P_3O_9$) and tetrametaphosphoric acid ($H_4P_4O_{12}$), or any combination thereof. Illustrative phosphoric acid derivatives can include, but are not limited to, aminopolyphosphonic acids such as amino trimethylene phosphonic acid, ethylene diamine tetramethylene phosphonic acid, methylene diphosphonic acid, hydroxyethylidene diphosphonic acid, 2-phosphonobutane 1,2,4, tricarboxylic acid, or any combination thereof. Other suitable phosphorous containing compounds can include, but are not limited to, phosphorous pentoxide ($P_4O_{10}$). Illustrative mineral acids, sulfonic acids, and carboxylic acids can include those discussed and described above with reference to the acid in line 102. In at least one specific embodiment, the acid in line 303 can be an acid other than a fatty acid. In at least one specific embodiment, the acid or combination of acids in line 303 is not a carboxylic acid. In at least one specific embodiment, the acid or combination of acids in line 303 is not a fatty acid.

The acid in line 303 can be introduced to the mixer 305, in an amount sufficient to produce a mixture therein having a pH of less than about 5.5, less than about 5, less than about 4.5, less than about 4, less than about 3.5, or less than about 3. For example, the pH of the mixture can range from a low of about 2, about 2.5, or about 3 to a high of about 4, about 4.5, or about 5. The particular amount of acid and/or the particular acid(s) introduced via line 303 to the mixer 305 can be depend, at least in part, on the amount of the glycerol and/or fatty acids in the glycerol-containing feed introduced via line 301 to the mixer 305. For example, the mole ratio of glycerol to acid can range from about 1:2 to about 50:1, from about 10:1 to about 30:1, from about 5:1 to about 20:1, or from about 10:1 to about 14:1. In another example, the mole ratio of glycerol to acid can be about 20:1, about 15:1, about 10:1, about 5:1, or about 1:1.

In one or more embodiments, the acid in line 303 can be diluted with water. For example, the ratio of water to acid can range from about 0.1:1 to about 50:1, about 1:1 to about 30:1, about 2:1 to about 20:1, about 3:1 to about 10:1, or about 1:1 to about 5:1. In another example, the ratio of water to acid can be about 1:1, about 2:1, about 3:1, about 4:1, about 5:1, about 6:1, about 7:1, about 8:1, about 9:1, or about 10:1. The additional water can help reduce and/or prevent the formation of methylphosphoric acid if the glycerol-containing feed in line 301 includes any methanol.

Decreasing the pH of the glycerol-containing feed in line 301 by mixing, blending, contacting, or otherwise combining the one or more acids in line 303 therewith can facilitate the separation of the glycerol from the glycerol-containing feed. The glycerol-containing feed via line 301 and the acid via line 303 can be combined within the mixer 305 to produce a mixture that can include the glycerol-rich portion and the glycerol-lean portion. The reduced or lower pH can facilitate, cause, or otherwise promote the formation of a first layer or "glycerol-lean portion" and a second layer or "glycerol-rich portion." Similar to the first and second layers discussed and described above with reference to FIGS. 1 and 2, the first layer or glycerol-lean portion and/or the second layer or glycerol-rich portion can be in the form of an emulsion, e.g., hydrocarbon-in-water emulsion, and/or in the form of a suspension or dispersion, e.g., hydrocarbon suspended or dispersed in water. The first layer can also be referred to as a "fatty acids-rich portion," and can include the fatty acids, soaps of fatty acids, and/or biodiesel from the glycerol-containing feed. The glycerol-rich portion can include the glycerol, monoglycerides, diglycerides, methanol, organic salts, inorganic salts, and/or water from the glycerol-containing feed.

The first portion or glycerol-lean portion via line 307 and the second portion or glycerol-rich portion via line 309 can be recovered from the mixer 305. The glycerol-rich portion in line 309 can have a glycerol concentration ranging from a low of about 30 wt %, about 40 wt %, or about 45 wt % to a high of about 55 wt %, about 60 wt %, about 65 wt %, about 75 wt %, about 85 wt %, about 95 wt %, or about 99 wt %. The glycerol-rich portion in line 309 can have a methanol concentration ranging from a low of about 1 wt %, about 5 wt %, or about 10 wt % to a high of about 25 wt %, about 35 wt %, or about 45 wt %. The glycerol-rich portion in line 309 can have a water concentration ranging from a low of about 5 wt %, about 10 wt %, or about 15 wt % to a high of about 20 wt %, about 35 wt %, or about 40 wt %. The glycerol-rich portion in line 309 can have a salt concentration ranging from a low of about 0.5 wt %, about 1 wt %, or about 2 wt % to a high of about 5 wt %, about 10 wt %, or about 15 wt %. The glycerol-rich portion in line 309 can also include residual or trace amounts, e.g., less than about 1 wt %, less than about 0.5 wt %, less than about 0.3 wt %, or less than about 0.1 wt %, of monoglycerides, proteins, amino acids, and/or gums, for example. The glycerol-rich portion in line 309 can have a fatty acids concentration of less than about 15 wt %, less than about 10 wt %, less than about 5 wt %, less than about 3 wt %, less than about 1 wt %, or less than about 0.5 wt %.

The glycerol-rich portion via line 309 can be introduced to a reactor 315. Should the glycerol-containing feed in line 301 be free or substantially free of fatty acids and soaps of fatty acids, the glycerol-containing feed can bypass the mixer 305 and can be introduced directly to the separator/reactor 315. The glycerol-containing feed in line 301, whether or not free or substantially free of fatty acids and soaps of fatty acids, can bypass the mixer 305 and can be introduced directly to the separator/reactor 315. If methanol is present and it is desirable to remove methanol or at least a portion thereof from the glycerol-rich portion in line 309, the glycerol-rich portion can be heated within the reactor 315 to a temperature ranging from about 65° C. to about 95° C. Heating the glycerol-rich portion to a temperature greater than about 65° C. or more can vaporize at least a portion of the methanol, which can be recovered via line 317. Recovering at least a portion of the methanol, if present, from the glycerol-rich portion in line 309 can produce a methanol-lean glycerol-rich portion within the reactor 315. If methanol is present in the glycerol-rich portion of line 309, the amount of methanol removed can produce a methanol-lean glycerol-rich portion within the reactor 315 that contains less than about 5 wt %, less than about 3 wt %, less than about 2 wt %, about less than 1 wt % methanol, less than about 0.5 wt %, or less than about 0.1 wt %. In at least one specific embodiment, all methanol, if present, can be removed from the glycerol-rich portion. In at least one specific embodiment, methanol can remain in the glycerol-rich portion, i.e., it can be optional as to whether or not any or all of the methanol may be removed from the glycerol-rich portion.

One or more acids via line 311 can be introduced to the reactor 315. The acid in line 311 can be or include one or more phosphoric acids, derivatives of phosphoric acids, mineral acids, sulfonic acids, carboxylic acids, or any combination thereof, which can be similar to the acids discussed and described above with reference to the acid in line 303. The acid in line 311 can react with at least a portion of the glycerol in the glycerol-rich portion of line 309 to produce a reacted product. The reacted product or "reaction product" can be recovered via line 319. All or a portion of the glycerol in the glycerol-rich portion can react with the acid to produce glycerophosphoric acid products. In at least one specific embodiment, the reaction between the glycerol-rich portion and the acid can be carried out to only partial completion. In other words, the reacted product in line 319 can include glycerophosphoric acid, glycerol, free phosphoric acid(s), salt(s) of the phosphoric acid(s), water, organic salts, inorganic salts, or any combination thereof.

The amount of acid introduced via line 311 to the reactor 315 can depend, at least in part, on the amount of glycerol in the glycerol-rich portion introduced via line 309. For example, the mole ratio of glycerol to acid can range from about 5:1 to about 1:5, from about 2:1 to about 1:2, from about 5:1 to about 1:1, or from about 4:1 to about 1:2. In at least one specific embodiment, total amount of acid introduced via both lines 303 and 311 can provide a glycerol to acid ratio of from about 8:1 to about 1:4, about 6:1 to about 1:3, about 4:1 to about 1:2, about 4:2 to about 1:1.5, or about 4:3 to about 1:1.

Before, during, and/or after the addition of the acid via line 311 to the reactor 315 the contents of the reactor can be heated to reduce the amount of water contained therein. The water can also be recovered via line 317. Removing at least a portion of any water contained in the glycerol-rich portion and/or the reacted product within the reactor 315 can include heating the contents of the reactor 315 to a temperature ranging from a low of about 90° C., about 93° C., or about 95° C. to a high of about 100° C., about 105° C., or about 110° C. For example, prior to introducing the acid via line 311 the glycerol-rich portion within the reactor 315 can be heated to reduce the concentration of water therein. As such, both methanol and water can be recovered from the reactor via line 317. In another example, prior to introducing the acid via line 317, but after removing at least a portion of any methanol via line 317 from the glycerol-rich portion, the glycerol-rich portion within the reactor 315 can be heated to a temperature of about 90° C. to about 110° C. to remove at least a portion of any water therein via line 317. In yet another example, at least a portion of the methanol can be removed via line 317, acid via line 311 can be introduced to the reactor 315, and the reactor 315 can then be heated to a temperature of about 90° C. to about 110° C. to remove at least a portion of any water therein via line 317. The amount of water that can be removed from the glycerol-rich portion, the methanol-lean glycerol-rich portion, or the reacted product can produce a mixture having less than about 15 wt %, less than about 12 wt %, less than about 10 wt %, less than about 8 wt %, or less than about 5 wt % water. For example, the water concentration of the reacted product produced by removing at least a portion of any methanol via line 317 and then introducing the acid via line 311 can be from about 4 wt % to about 13 wt %.

The concentration of glycerophosphoric acid in the reacted product in line 319 can be from a low of about 1 wt %, about 3 wt %, about 5 wt %, or about 10 wt % to a high of about 55 wt %, about 65 wt %, about 75 wt %, about 85 wt %, about 90 wt %, or about 100 wt %. The concentration glycerol in the reacted product can range from a low of about 0 wt %, about 0.5 wt %, about 1 wt %, about 3 wt %, about 5 wt %, or about 7 wt % to a high of about 20 wt %, about 30 wt %, about 40 wt %, or about 50 wt %. The concentration of free phosphoric acid(s) can be from a low of about 0 wt %, about 0.5 wt %, about 1 wt %, about 3 wt %, about 5 wt %, or about 7 wt % to a high of about 20 wt %, about 30 wt %, about 40 wt %, or about 50 wt %. The concentration of salt(s) of the phosphoric acid(s) can range from a low of about 0 wt %, about 0.5 wt %, about 1 wt %, about 3 wt %, about 5 wt %, or about 7 wt % to a high of about 20 wt %, about 30 wt %, about 40 wt %, or about 50 wt %. The concentration of water in the reacted product can range from a low of about 0 wt %, about 0.5 wt %, about 1 wt %, about 3 wt %, about 5 wt %, or about 7 wt % to a high of about 9 wt %, about 11 wt %, about 13 wt %, about 14 wt %, about 17 wt %, or about 20 wt %. The concentration of organic and/or inorganic salt(s) can range from a low of about 0 wt %, about 0.5 wt %, about 1 wt %, about 2 wt %, or about 3 wt % to a high of about 6 wt %, about 7 wt %, about 8 wt %, about 9 wt %, or about 10 wt %. In at least one embodiment, the reacted product in line 319 can include minor or residual amounts of methylphosphoric acid. For example, the reacted product in line 319 can include about 3 wt % or less, about 2 wt % or less, about 1 wt % or less, about 0.5 wt % or less, or about 0.1 wt % or less methylphosphoric acid. In at least one specific embodiment, the reacted product in line 319 can be free or substantially free, i.e., less than 1 wt %, of any one or more of glycerol, free phosphoric acid, salt(s) of the phosphoric acid(s), water, organic and/or inorganic salt(s), and methylphosphoric acid.

The reacted product in line 319 can also have a pH of less than about 5, less than about 4, less than about 3.5, less than about 3, less than about 2.5, less than about 2, or less than about 1. The pH of the reacted product can also be from a low of about 0, about 1.5, or about 2 to a high of about 2.5, about 3, about 3.5, or about 4.

The reacted product in line 319, can also have a flash point greater than about 30° C., greater than about 38° C., greater than about 50° C., greater than about 66° C., or greater than about 93° C. and less than about 300° C., less than about 250° C., or less than about 200° C. For example, the reacted product in line 319 can have a flash point of about 32° C., about 54° C., about 60° C., about 68° C., about 75° C., or about 95° C. The reacted product in line 319 can also have a freezing point of less than about −25° C., less than about −50° C., less than about −60° C., or less than about −65° C.

The reacted product via line 319 can be recovered as a final product via line 321. The reacted product via line 319 can be introduced via line 323 to one or more mixers 330. A portion of the reacted product in line 319 can be recovered as a final product via line 321 and a portion of the reacted product in line 319 can be introduced via line 323 to the one or more mixers 330.

All or a portion of the reacted product in line 319 can be introduced via line 323 and a base compound via line 325 can be introduced to the mixer 330 to produce a neutralized product therein. In other words, the pH of the reacted product introduced via line 323 to the mixer 330 can be increased to produce a neutralized product via line 333. The amount of base or base compound via line 325 introduced to the mixer 330 can be sufficient to produce a "neutralized" product having a pH of from a low of about 5.5, about 6, or about 6.5 to a high of about 7, about 7.5, or about 8. The neutralized product can be recovered via line 333 from the mixer 330. In another example, the pH of the reacted product introduced via line 323 to the mixer 330 can be increased to greater than about 7, greater than about 8, greater than about 9, greater than about 10, greater than about 11, or greater than about 12. For example, the pH of the reacted product can be increased to a pH ranging from about 5.5 to about 12, about 7 to about 12, about 9 to about 12, about 10 to about 12, or about 8.5 to about 11. As such, a basic product can also be recovered via line 333 from the mixer 330. The particular base compound or combination of base compounds and the amount(s) thereof that can be added to the reacted product within the mixer 330 can depend, at least in part, on the amount of the particular composition or make-up of the reacted product, i.e., the particular components and the relative amount of those components contained in the reacted product.

The base compound in line 325 can be or include any base or combination of two or more bases. Illustrative bases or base compounds in line 325 can include, but are not limited to, potassium hydroxide (KOH), sodium hydroxide (NaOH), lithium hydroxide (LiOH), amines, or any combination thereof. Amines can include, but are not limited to, alkanolamines, polyamines, aromatic amines, and any combination thereof. Illustrative alkanolamines can include, but are not limited to, monoethanolamine ("MEA"), diethanolamine ("DEA"), triethanolamine ("TEA"), or any combination thereof. Illustrative aromatic amines can include, but are not limited to, benzyl amine, aniline, ortho toludine, meta toludine, para toludine, n-methyl aniline, N—N'-dimethyl aniline, di- and tri-phenyl amines, 1-naphthylamine, 2-naphthylamine, 4-aminophenol, 3-aminophenol and 2-aminophenol. Illustrative polyamines can include, but are not limited to, diethylenetriamine ("DETA"), triethylenetetramine ("TETA"), tetraethylenepentamine ("TEPA") 1,3-propanediamine, 1,4-butanediamine, polyamidoamines, and polyethylenimines.

Figure 4:
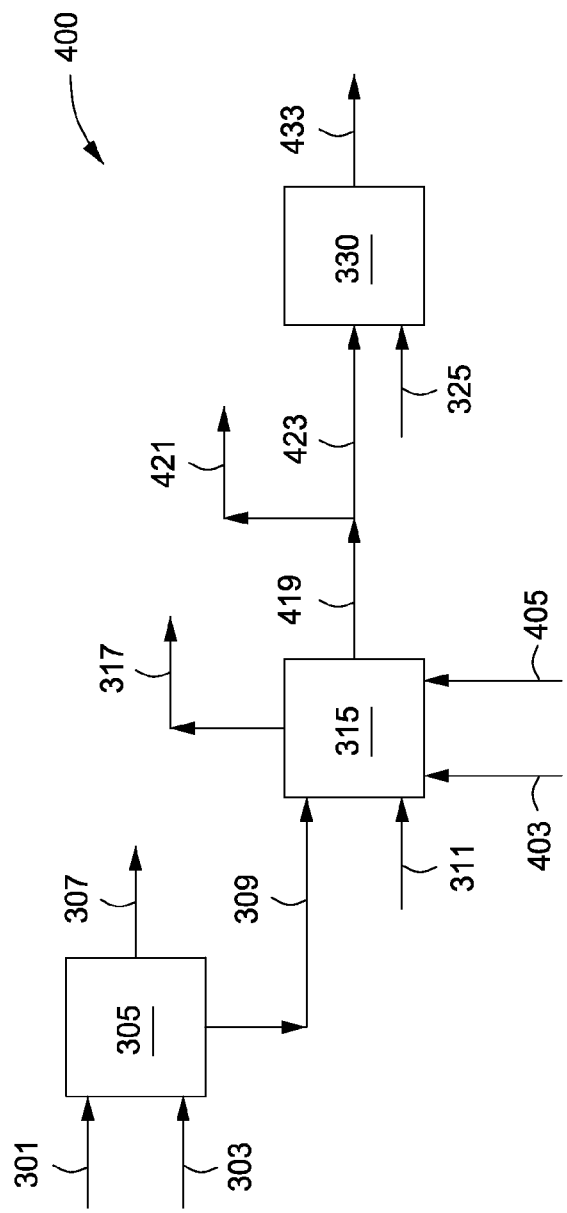
FIG. 4 depicts another illustrative system for processing glycerol, according to one or more embodiments described.

FIG. 4 depicts another illustrative system 400 for processing glycerol, according to one or more embodiments. The system 400 can be similar to the system 300 discussed and described above with reference to FIG. 3. As discussed above, the glycerol-containing feed via line 301 and the acid via line 303 can be introduced to the one or more mixers 305, where the two components can be mixed, blended, contacted, or otherwise combined together to produce a mixture and separated into at least two fractions or portions. From the mixer 305, the first portion or glycerol-lean portion via line 307 and the glycerol-rich portion via line 309 can be recovered from the mixer 305. The glycerol-rich portion via line 309 can be introduced to the reactor 315 and methanol and/or water via line 317 can be removed therefrom. The acid via line 311 can be introduced to the reactor 315 to produce the reacted produce therein, which can be as discussed and described above with reference to FIG. 3.

The reactor 315 in the system 400 can further include one or more additional lines in fluid communication therewith (two are shown 403, 405). One or more oxidants via line 403 can be introduced to the reactor 315. One or more catalysts via line 405 can be introduced to the reactor 315. In still another example, both one or more oxidants via line 403 and one or more catalysts via line 405 can be introduced to the reactor 315. The oxidant and/or the catalyst can react with the reacted product at conditions sufficient to produce an oxidized product via line 419.

The one or more oxidants in line 403 can include, but are not limited to, hydrogen peroxide ($H_2O_2$), oxygen ($O_2$), ozone ($O_3$), oxygen-containing gases, e.g., air, sodium permanganate, potassium permanganate, sodium persulfate, potassium persulfate, magnesium peroxide, calcium peroxide, sodium percarbonate, or any combination thereof. The amount of oxidant introduced via line 403 to the reactor 315 can vary. The amount of oxidant introduced via line 403 to the reactor 315 can be sufficient to at least partially oxidize the glycerophosphoric acid to produce phosphoglyceric acid. In at least one specific embodiment, the amount of oxidant introduced via line 403 to the reactor 315 can be less than the amount required for complete oxidation of the reacted product therein. In other words, the oxidized product in line 419 can be a partially oxidized product. The amount of oxidant introduced via line 403 can depend, at least in part, on the amount of the glycerol-rich portion introduced via line 309 to the reactor 315 and/or the particular composition or make-up of the reacted product produced by reacting the glycerol-rich portion with the one or more acids introduced via line 311. The particular composition or make-up of the glycerol-rich portion and/or the reacted product can include the particular components and the relative amount of those components contained therein. The amount of oxidant introduced via line 403, based on the number of moles oxidant per mole of glycerophosphoric acid, can range from a low of about 0.1, about 0.5, or about 1 to a high of about 1.5, about 2, about 2.5, or about 3.

In at least one specific embodiment, the one or more catalysts via line 405 can be introduced to the reactor 315, in addition to or in lieu of the oxidant via line 403, to produce the oxidized or partially oxidized product via line 419. For example, hydrogen peroxide via line 403 and a catalyst, e.g., ferrous sulfate, via line 405 can be introduced to the reactor 315. Other catalysts via line 405 that can be used in lieu of or in addition to the oxidant in line 403 can include, but are not limited to, carbon supported platinum, carbon supported palladium, silicates, aluminophosphates, or any combination thereof.

The glycerol-rich portion via line 309, acid via line 311, oxidant via line 403, and/or the catalyst via line 405 can be introduced to the reactor 315 in any order or sequence. For example, the glycerol-rich portion via line 309 and the acid via line 311 can be mixed and reacted within the reactor 315 to produce the reacted product therein. After producing the reacted product the oxidant via line 403 and/or the catalyst via line 405 can be introduced to the reactor 315 to produce the oxidized product therein. In another example, the glycerol-rich portion via line 309, the acid via line 311, and the oxidant via line 403 can be introduced to the reactor 315 at the same or substantially the same time and mixed and reacted together with in the reactor 315 to produce the oxidized product therein. In another example, the oxidant via line 403 and/or the catalyst via line 405 and the glycerol-rich portion via line 309 can be introduced to the reactor 315 and reacted and then the acid via line 311 can be introduced to the reactor 315 and reacted to produce the oxidized product therein. In another example, the oxidant via line 403 and/or the catalyst via line 405 can be introduced to the reactor 315 and mixed with the glycerol-rich portion prior to removal of any methanol that can be contained in the glycerol-rich portion and the addition of the acid via line 311.

In at least one specific embodiment, at least a portion of the glycerol-rich portion and acid and/or the reacted product can react with the oxidant, the catalysts, or both, at conditions sufficient to produce the oxidized product via line 419 that can include, but is not limited to, carboxylic acids, hydroxyl carboxylic acids, dicarboxylic acids, phosphoglyceric acid, glycerophosphoric acid, free glycerol, free phosphoric acid, water, glyceric acid, oxalic acid, glycolic acid, formic acid, glyceraldehydes, hydroxypyruvic acid, tartronic acid, derivatives thereof, or any combination thereof. In one or more embodiments, at least a portion of the methanol, if present, can react with the oxidant at conditions sufficient to produce formic acid. Suitable conditions include a temperature of about 70° C. or less, about 65° C. or less, about 60° C. or less, or about 55° C. or less. For example, the reaction temperatures can range from a low of about 0° C., about 15° C., or about 20° C. to a high of about 50° C., about 65° C., or about 75° C., although higher temperatures are envisaged.

The particular makeup or composition of the oxidized product in line 419 can widely vary. The oxidized product in line 419 can have a concentration of phosphoglyceric acid from a low of about 1 wt %, about 3 wt %, about 5 wt %, about 7 wt %, about 10 wt %, or about 15 wt % to a high of about 50 wt %, about 60 wt %, about 70 wt %, about 80 wt %, about 90 wt %, or about 100 wt %. The oxidized product in line 419 can have a concentration of glycerophosphoric acid from a low of about 1 wt %, about 3 wt %, about 5 wt %, about 7 wt %, about 10 wt %, about 13 wt %, or about 15 wt % to a high of about 30 wt %, about 35 wt %, about 40 wt %, about 45 wt %, or about 50 wt %. The oxidized product in line 419 can have a concentration of free glycerol from a low of about 1 wt %, about 3 wt %, about 5 wt %, about 7 wt %, about 10 wt %, about 13 wt %, or about 15 wt % to a high of about 30 wt %, about 35 wt %, about 40 wt %, about 45 wt %, or about 50 wt %. The oxidized product in line 419 can have a concentration of carboxylic acids from a low of about 1 wt %, about 3 wt %, about 5 wt %, about 7 wt %, about 10 wt %, about 13 wt %, or about 15 wt % to a high of about 30 wt %, about 35 wt %, about 40 wt %, about 45 wt %, or about 50 wt %. The oxidized product in line 419 can have a concentration of hydroxyl carboxylic acids from a low of about 1 wt %, about 3 wt %, about 5 wt %, about 7 wt %, about 10 wt %, or about 12 wt % to a high of about 20 wt %, about 22 wt %, about 24 wt %, about 26 wt %, about 28 wt %, or about 30 wt %. The oxidized product in line 419 can have a concentration of dicarboxylic acids from a low of about 1 wt %, about 3 wt %, about 5 wt %, about 7 wt %, about 10 wt %, or about 12 wt % to a high of about 25 wt %, about 28 wt %, about 30 wt %, about 33 wt %, about 35 wt %, about 37 wt %, or about 40 wt %. The oxidized product in line 419 can have a concentration of free phosphoric acid from a low of about 1 wt %, about 3 wt %, about 5 wt %, about 7 wt %, about 10 wt %, or about 12 wt % to a high of about 25 wt %, about 28 wt %, about 30 wt %, about 33 wt %, about 35 wt %, about 37 wt %, or about 40 wt %. The oxidized product in line 419 can have a concentration of water from a low of about 1 wt %, about 3 wt %, about 5 wt %, or about 7 wt % to a high of about 10 wt %, about 12 wt %, about 14 wt %, about 17 wt %, about 20 wt %, or about 25 wt %. The oxidized product in line 419 can have a concentration of glyceric acid from a low of about 1 wt %, about 3 wt %, about 5 wt %, about 7 wt %, about 10 wt %, about 13 wt %, or about 15 wt % to a high of about 30 wt %, about 35 wt %, about 40 wt %, about 45 wt %, or about 50 wt %. The oxidized product in line 419 can have a concentration of oxalic acid ranging from a low of about 1 wt %, about 1.5 wt %, about 2 wt %, or about 2.5 wt % to a high of about 3.5 wt %, about 4.5 wt %, about 5 wt %, or about 6 wt %. The oxidized product in line 419 can have a concentration of glycolic acid from a low of about 1 wt %, about 2 wt %, about 3 wt %, or about 4 wt % to a high of about 6 wt %, about 7 wt %, about 8 wt %, about 9 wt %, or about 10 wt %. The oxidized product in line 419 can have a concentration of formic acid from a low of about 1 wt %, about 3 wt %, about 5 wt %, about 7 wt %, about 10 wt %, or about 12 wt % to a high of about 25 wt %, about 28 wt %, about 30 wt %, about 33 wt %, about 35 wt %, about 37 wt %, or about 40 wt %. The oxidized product in line 419 can have a concentration of glyceraldehydes acid from a low of about 1 wt %, about 2 wt %, about 3 wt % or about 5 wt % to a high of about 7 wt %, about 8 wt %, about 9 wt %, or about 10 wt %. The oxidized product in line 419 can have a concentration of hydroxypyruvic acid from a low of about 1 wt %, about 3 wt %, about 5 wt %, about 7 wt % or about 9 wt % to a high of about 13 wt %, about 15 wt %, about 17 wt %, or about 20 wt %. The oxidized product in line 419 can have a concentration of tartronic acid ranging from a low of about 1 wt %, about 3 wt %, about 5 wt %, about 7 wt %, or about 9 wt % to a high of about 20 wt %, about 22 wt %, about 24 wt %, about 26 wt %, about 28 wt %, or about 30 wt %. In one or more embodiments, the oxidized product can be free or substantially free, i.e., less than 1 wt %, of any one or more of glycerophosphoric acid, free glycerol, carboxylic acids, hydroxyl carboxylic acids, dicarboxylic acids, free phosphoric acid, water, oxalic acid, glycolic acid, formic acid, glyceraldehydes acid, hydroxypyruvic acid, and tartronic acid.

The oxidized product via line 419 can be recovered as a final product via line 421. The oxidized product via line 419 can be introduced via line 423 to one or more mixers 330, which can be similar to the mixer 330 discussed and described above with reference to FIG. 3. A portion of the oxidized product in line 419 can be recovered as a final product via line 421 and a portion of the oxidized product in line 419 can be introduced via line 423 to the one or more mixers 330.

All or a portion of the oxidized product in line 419 can be introduced via line 423 and a base compound via line 325 can be introduced to the mixer 330 to produce a neutralized product therein. In other words, the pH of the oxidized product introduced via line 423 to the mixer 330 can be increased to produce a neutralized oxidized product. The amount of base or base compound via line 325 introduced to the mixer 330 can be sufficient to produce a "neutralized" oxidized product having a pH ranging from a low of about 5.5, about 6, or about 6.5 to a high of about 7, about 7.5, or about 8. The neutralized oxidized product can be recovered via line 433 from the mixer 330. In another example, the pH of the oxidized product introduced via line 423 to the mixer 330 can be increased to greater than about 7, greater than about 8, greater than about 9, greater than about 10, greater than about 11, or greater than about 12. For example, the pH of the oxidized product can be increased to a pH ranging from about 5.5 to about 12, about 7 to about 12, about 9 to about 12, about 10 to about 12, or about 8.5 to about 11. As such, a basic oxidized product can also be recovered via line 333 from the mixer 330. The base compound in line 325 can be as discussed and described above with reference to FIG. 3. The particular base compound or combination of base compounds and the amount(s) thereof that can be added to the reacted product within the mixer 330 can depend, at least in part, on the amount of the particular composition or make-up of the oxidized product, i.e., the particular components and the relative amount of those components contained in the oxidized product.

The systems 300 and 400, as discussed and described above can include the mixer 305, reactor 315, and mixer 330. However, any two or more of the mixer 305, reactor 315, and mixer 330 can be combined into a single unit. In other words, the mixing, separation, e.g., the separation of the glycerol-lean portion via line 307 from the mixer 305 and the separation of the methanol and/or water via line 317 from the reactor 315, and/or the mixing of the base via line 325 and the reacted product via line 323 or the reacted product via line 423 can take place in a single vessel, two vessels, or as shown in FIGS. 3 and 4, a plurality of vessels. The depiction of multiple vessels, i.e., the mixer 305, reactor 315, and mixer 330, while suitable for the processing of glycerol, is also preferable for clarity and ease of description. Accordingly any two or more of the steps discussed and described above can be carried out in a single vessel or any number of vessels.

The mixers 305, 330 can be any device or system suitable for batch, intermittent, and/or continuous mixing of two or more components. For example, the mixer 305 can be any device or system suitable for mixing the glycerol-containing fee in line 301 and the acid in line 303. The mixers 305, 330 can be capable of producing a homogenized mixture. Illustrative mixers can include, but are not limited to, mechanical mixer agitation, ejectors, static mixers, mechanical/power mixers, shear mixers, sonic mixers, or combinations thereof. The mixers 305, 330 can operate at temperatures of about 25° C. to about 150° C. The mixers 305, 330 can include one or more heating jackets, heating coils, internal heating elements, cooling jacks, cooling coils, internal cooling elements, or the like, which can heat the mixture to a temperature of from about 25° C. to about 150° C., for example. Should methanol be contained in the glycerol-containing feed in line 301 and the mixer 305 heats the mixture to a temperature greater than the boiling point of methanol, a methanol recovery line can be in fluid communication with the mixer 330 to recover the vaporized methanol as a product. Similarly, water can be recovered from the mixer 330.

The reactor 315 can be any container or environment suitable for batch, intermittent, and/or continuous contacting of the glycerol-rich portion in line 309 with the oxidant in line 403 and/or the catalyst in line 405. The reactor 315 can be an open vessel or a closed vessel. The reactor 315 can include one or more mixing devices such as one or more mechanical/power mixers and/or acoustic mixers such as sonic mixers. The reactor 315 can include a cooling jacket and/or coil for maintaining a temperature of the reaction mixture below a predetermined temperature. The reactor 315 can include one or more nozzles, fluid distribution grids, or other device(s) for introducing the oxidant to the reactor 315.

The products, i.e., the reacted product in line 321, the neutralized reacted product in line 333, the oxidized product in line 421 and/or the neutralized oxidized product in line 433, can be used in a number of applications as produced, diluted, and/or mixed with other compounds, fluids, or components. The products in lines 321, 333, 421, and/or 433 can be diluted with water, for example. In another example, the products in lines 321, 333, 421, and/or 433 can be mixed or blended with corrosion inhibitors, polymers, salts, scale removers, surfactants, inhibitors, or any combination thereof. In another example, the products in lines 321, 333, 421, and/or 433 can be mixed or blended with water, corrosion inhibitors, polymers, slats, scale removers, surfactants, inhibitors, or any combination thereof. The amount of the products in lines 321, 333, 421, and/or 433 that can be admixed with a particular component can depend, at least in part, on the particular composition of that fluid and the conditions of temperature and pressure to which the fluid mixture can be subjected. As such, once the particular system and the conditions of the system have been determined, the particular amount of product via lines 321, 333, 421, and/or 433 that can be introduced to that system and the desired amount of any other component that can be mixed therewith can be determined.

One particular use or application of the products in lines 321, 333, 421, and/or 433 can be to remove, inhibit, and/or reduce inorganic mineral scale deposits ("scale"). The formation of scales can be caused by a number of factors, which can include, but are not limited to, pressure drops, temperature fluctuations, changes in pH or ionic strength, and any combinations thereof. The products in line 321, 333, 421, and/or 433 can act or work as an acid, a sequestrant, a chelant, a dispersing agent, a solvent, or any combination thereof for removing scale(s). The products in line 321, 333, 421, and/or 433 can be prevent or inhibit the formation of scales.

In the context of oilfield operations, commonly encountered scales include, but are not limited to, calcium carbonate ($CaCO_3$), calcium sulfate ($CaSO_4$), barium sulfate ($BaSO_4$); and sodium chloride (NaCl). Other inorganic mineral deposits can include, strontium sulfate ($SrSO_4$), strontium carbonate ($SrCO_3$), iron oxide ($Fe_2O_3$), iron carbonate ($FeCO_3$), iron sulfide (FeS), barium-strontium sulfate ($BaSr(SO_4)_2$), magnesium carbonate ($MgCO_3$), magnesium sulfate ($MgSO_4$), or any combination thereof. For example, the reacted product in line 321 can remove barium sulfate deposits in an amount of about 1,000 ppm, about 2,500 ppm, about 4,000 ppm, about 5,000 ppm, about 6,000 ppm, about 7,000 ppm, or about 8,000 ppm barium sulfate.

The formation or precipitation of scale deposits can occur in, for example, oil production and/or processing equipment, which can be located above and/or below the surface. The formation or precipitation of scale deposits can also occur in subterranean formations, such as an oil and/or gas producing formations. Oil production and processing equipment can include, flow lines, heaters, pumps, valves, pipes, pipelines, risers, drill strings, wellbores, downhole pumps, perforations, fractures, fissures, and the like. Other areas in which scale deposits can be problematic include, but are not limited to, the chemical processing industries, public utilities, and other processes in which mineral-laden water is processed or used, as in heat exchangers, storage vessels, piping, reactors, evaporators, and the like.

Introducing the products in lines 321, 333, 421, and/or 433 to equipment, formations, and/or other locations where scale deposits form or can potentially form can reduce scale and/or inhibit or prevent the formation of scale. The products, at any desired concentration, can be used to remove scale and/or prevent or reduce the formation of scale. The products in lines 321, 333, 421, and/or 433 can be diluted with water to have a water concentration of from about 1 wt % to about 99 wt %, for example. The products in lines 321, 333, 421, and/or 433 can be diluted with water, as needed, to produce a reacted product having a desired concentration.

In one or more embodiments, the products in lines 321, 333, 421, and/or 433 can be used to demulsify an emulsion. The products 333 and/or 433, for example, can demulsify an emulsion by lowering the pH of the emulsion and/or by increasing the specific gravity of the produced water. The emulsion can be or include any two or more immiscible or substantially immiscible liquids. For example, the emulsion can be an oil in water emulsion, i.e., an emulsion that contains more oil than water based on weight. In another example, the emulsion can be a water in oil emulsion, i.e., an emulsion that contains more water than oil based on weight. The products can be used as produced, diluted, and/or mixed with other ingredients that can improve the demulsification. Illustrative additional ingredients or additives that can be added to the products to improve or facilitate demulsification of an emulsion can include, but are not limited to, silicon compounds, glycols, salts, any other water soluble demulsifiers, or any combination thereof.

In one or more embodiments, the products in lines 321, 333, 421, and/or 433 can be used as a frac fluid, drilling fluid, or component thereof for oil and gas production. The products in lines 321, 333, 421, and/or 433 can be used neat or mixed or blended with one or more other fluids. An illustrative frac fluid, for example, can include about 5-25 wt % of one or more of the products in lines 321, 333, 421, and/or 433, about 5-25 wt % formic acid, about 5-25 wt % reacted product, and about 45-65 wt % water. Illustrative blending agents and/or additives can include, but are not limited to, drilling fluids, steam, corrosion inhibitors, water, acids such as hydrochloric acid, surfactants, polymers such as polyols, polyamides, poly celluloses, poly(acrylic acids), or any combination thereof. For drilling, the products can be particularly useful in water-based drilling fluids.

In one or more embodiments, the products in lines 321, 333, 421, and/or 433 can be used as an anti-icing compound. The products can be used neat, diluted with water, or blended with one or more additives. In at least one specific embodiment, the anti-icing compound can be sprayed, injected, or otherwise introduced on, in, or to pipelines, processing equipment, diluents for chemicals, storage tanks, ships, oil rigs, trucks, airplanes, roads, automobiles, machinery, and storage equipment, for example. In at least one other specific embodiment, the anti-icing compound can be sprayed, injected, or otherwise introduced into pipelines or other fluid conveying structures, processing equipment, and storage tanks, for example. The anti-icing compound can be mixed or otherwise combined with one or more fluids flowing through pipelines or other fluid conveying structures, fluids processed within processing equipment, and/or fluids stored within storage tanks. The amount of anti-icing compound, i.e., products in lines 321, 333, 421, and/or 433, introduced to a pipeline, storage tank, and/or mixed with fluids processed in processing equipment, stored in storage tanks, and/or transported through pipelines or other fluid conveying structures can range from a low of about 0.001 wt %, about 0.01 wt %, about 0.1 wt %, or about 0.5 wt % to a high of about 1 wt %, about 3 wt %, about 5 wt %, about 10 wt %, or about 20 wt %, based on a combined weight of the fluids stored and/or transported and/or processed therein and the anti-icing compound. In another example, the amount of anti-icing compound, i.e., products in lines 321, 333, 421, and/or 433, introduced to a pipeline, storage tank, and/or mixed with fluids processed in processing equipment, stored in storage tanks, and/or transported through pipelines or other fluid conveying structures can range from a about 0.001 wt % to about 30 wt %, about 0.01 wt % to about 25 wt %, about 0.1 wt % to about 20 wt %, about 0.5 wt % to about 15 wt %, about 1 wt % to about 13 wt %, about 3 wt % to about 11 wt %, or about 5 wt % to about 10 wt %, based on the combined weight of the fluids stored and/or transported and/or processed therein and the anti-icing compound. In yet another example, the amount of anti-icing compound, i.e., products in lines 321, 333, 421, and/or 433, introduced to a pipeline, storage tank, and/or mixed with fluids processed in processing equipment, stored in storage tanks, and/or transported through pipelines or other fluid conveying structures can range from a about 10 wt % to about 30 wt %, about 7 wt % to about 20 wt %, about 10 wt % to about 15 wt %, about 5 wt % to about 10 wt %, about 7 wt % to about 13 wt %, about 10 wt % to about 20 wt %, or about 15 wt % to about 30 wt %, based on the combined weight of the fluids stored and/or transported and/or processed therein and the anti-icing compound.

The presence of the anti-icing compound can prevent, reduce, and/or inhibit the formation of ice on, within, or about one or more structures. The presence of the anti-icing compound can prevent, reduce, and/or inhibit the formation of ice within one or more fluids prone to icing. The particular amount of anti-icing compound used for any given application can depend, at least in part, on one or more variables such as the particular fluid(s) combined therewith, structure(s) applied thereon, thereto, and/or thereabout, and/or structure(s) introduced thereto and/or fluid(s) present within those structures.

In one or more embodiments, the products in lines 321, 333, 421, and/or 433 can be used as a general purpose cleaner. As a general purpose cleaner, the products can be used neat, diluted with water, or blended with one or more additives. Suitable additives can include, but are not limited to, polymers, salts, and/or other treatment chemicals that can expand or enhance one or more functional properties of the reacted products. In at least one specific embodiment, the products can be diluted with water to produce a cleaning solution having a concentration of the reacted product ranging from about 100 ppmw to about 40 wt %. At least one specific application for the reacted products in lines 321, 333, 421, and/or 433 can be to remove scale and/or other build-up on toilets, sinks, bath tubs, showers, faucets, nozzles, and the like.

In one or more embodiments, the reacted products in lines 321, 333, 421, and/or 433 can be used as a drain cleaner. For example, one or more of the products in lines 321, 333, 421, and/or 433 can be introduced to a clogged drain or other clogged conduit. The one or more of the products in lines 321, 333, 421, and/or 433 can be allowed to react, dissolve, loosen, or otherwise affect the clog such that the drain or other conduit allows fluid to flow therethrough with a reduced resistance to flow as compared to before introducing the one or more of the products lines 321, 333, 421, and/or 433 thereto.

In one or more embodiments, the products in lines 321, 333, 421, and/or 433 can be used to prevent or reduce the formation of hydrates in a fluid containing one or more hydrate-forming constituents by contacting the fluid with the reacted product(s). For example, the neutralized reacted via line 333 and/or the neutralized oxidized products via line 433 can be introduced to a fluid or system that contains hydrates or in which hydrates can potentially form, e.g., a hydrocarbon gas stream containing methane and/or natural gas. Illustrative systems can include, but are not limited to, hydrocarbon production/processing equipment, pipelines, storage tanks, and the like. In at least one specific embodiment, the reacted products can be introduced into a downhole location such as a hydrocarbon production well to control hydrate formation in fluids produced therefrom. In another example, the products can be introduced to a produced hydrocarbon at a wellhead location or into a riser through which produced hydrocarbons are transported in offshore operations from the ocean floor to an offshore production facility. In still another example, the products can be introduced to a hydrocarbon prior to transporting the hydrocarbon, for example, via a subsea pipeline from an offshore production facility to an onshore gathering and/or processing facility. In one or more embodiments, the products can be introduced to a downhole location as a drilling fluid or as a component of a drilling fluid.

In one or more embodiments, the products in lines 321, 333, 421, and/or 433 can be used to recover a gas that is bound or entrained in a formed hydrate. In at least one specific embodiment, the neutralized reacted product via line 321 and/or the neutralized oxidized product via line 433 can be introduced into a downhole location or any other location that contains or may contain hydrates where the second reacted product can release at least a portion of any gases bound or contained in the hydrate(s) present therein. The released gases bound in the hydrate(s) can be recovered as a product.

A mixture that can potentially form or contain hydrates can include, for example a water and gas mixture. The gas can be a hydrocarbon normally gaseous at 25° C. and 100 kPa, such as an alkane of 1-4 carbon atoms, e.g., methane, ethane, propane, n-butane, isobutane, or an alkene of 2-4 carbon atoms e.g., ethylene, propylene, n-butene, isobutene, or any combination thereof. The gas can include about 80 wt %, about 90 wt %, or more methane. The gas can also include about 0.1 wt % to about 10 wt % $C_2$ hydrocarbons and about 0.01 wt % to about 10 wt % $C_3$ hydrocarbons.

In one or more embodiments, the products via line 321, 333, 421, and/or 433 can be used to remove existing corrosion within a system. In one or more embodiments, the products via line 321, 333, 421, and/or 433 can be used to reduce or prevent corrosion within a system. For example the products via line 321, 333, 421, and/or 433 can be used to reduce or prevent corrosion within a pipeline or riser. The products in lines 321, 333, 421, and/or 433 can deposit or otherwise form a protective layer on a metal surface that can reduce or prevent corrosion of the metal surface.

In one or more embodiments, the reacted product via line 321 and/or the oxidized product via line 421 can be used to unswell or otherwise reduce the size of clay and/or polymer particles that have been introduced to a formation. Illustrative clays that can be unswelled with the reacted product in line 321 and/or the oxidized product in line 421 can include, but are not limited to, chlorite clays, illite clays, kaolinite clays, smectite clays such as montomorillonite, bentonite clays such as sodium bentonite, calcium bentonite, and potassium bentonite, or any combination thereof. Illustrative polymers that can be unswelled with the reacted product in line 321 and/or the oxidized product in line 421 can include, but are not limited to, polyacrylic acid (PAA), polymethacrylic acid (PMA), poly maleic anhydride, polyvinyl alcohol (PVOH), polyamides, low-viscosity latex, or any combination thereof. Other polymers that can be unswelled with the reacted product in line 321 and/or the oxidized product in line 421 can include polyethylene oxide, polypropylene oxide, polyoxymethylene, polyvinyl methyl ether, polyethylene imide, polyvinyl alcohol, polyvinyl pyrrolidone, polyethyleneimine, polyethylene sulfonic acid, polysilicic acid, polyphosphoric acid, polystyrene sulfonic acid, polyvinylamine, natural water soluble polymers, guar derivatives, cellulose derivatives, xanthan, chitosan, diutan, any suitable copolymers, or mixtures thereof. The reacted product in line 321 and/or the oxidized product in line 421 can reduce the volume or size of a swelled clay and/or polymer particle by about 2%, about 4%, about 6%, about 8%, about 10%, about 12%, about 14%, about 16%, about 18%, or about 20%.

In one or more embodiments, one or more of the reacted products in lines 116, 222, and/or 232 and/or the products via line 321, 333, 421, and/or 433, or simply any one or more of "the products" can be used for one or more agricultural applications. For example, one or more of the products can be used to adjust a pH of soil. In another example, one or more of the products can be used as a carrier fluid and/or to convert one or more elements or nutrients into a solubilized or otherwise suitable form that can be used by plants or crops. As such, any one or more of the products can be used as a fertilizer for supplying one or more elements or nutrients to the soil. In another example, one or more of the products can be used to adjust the pH of soil and as a carrier fluid and/or to convert one or more elements into a solubilized or otherwise suitable form that can be used by plants or crops.

Depending on the pH of the soil, the one or more of the products can be applied to the soil to reduce or increase the pH thereof. For example, a soil having a pH ranging from about 7.5 to about 10 can be reduced to a pH ranging from about 5 to 7.5 by applying one or more of the products thereto. As such, a soil having a pH of about 7 or more, about 7.5 or more, about 8 or more, about 8.5 or more, about 9 or more, about 9.5 or more, or about 10 or more can be reduced by applying one or more of the products thereto. The pH of the soil, during and/or after application of one or more of the products can be from a low of about 4, about 4.5, about 5, or about 5.5 to a high of about 6, about 6.5, about 7, or about 7.5. For example, the pH of the soil can be adjusted via addition or application of one or more of the products to provide a soil having a pH of about 5 to about 7, about 5.5 to about 6.5, about 6 to about 6.5, about 6.5 to about 7, about 5.5 to about 8, about 6 to about 7.5, about 5.5 to about 7, about 6 to about 7, or about 6 to about 8.

Any desired amount of one or more of the products can be applied to the soil. The particular amount of the one or more products that can be applied to the soil to reduce or increase the pH thereof, add or otherwise convey one or more elements or nutrients thereto, or a combination thereof, can depend, at least in part, on the particular pH of the soil, the composition of the soil, the strength of the one or more products to be applied to the soil, e.g., the particular product(s) and/or the concentration of the particular product, or any combination thereof. As such, the one or more of the products can be applied to the soil in an amount from a low of about 1 L, about 4 L, about 50 L, about 100 L, about 500 L, or about 1,000 L to a high of about 5,000 L, about 10,000 L, about 15,000 L, about 20,000 L, about 25,000 L, about 30,000 L, about 35,000 L, or about 40,000 L per hectare.

One or more of the reacted products in lines 116, 222, and/or 232 and/or the products via line 321, 333, 421, and/or 433 can be applied to the soil in any desired manner. For example, one or more of the products can be applied directly to the soil, e.g., by spraying, misting, dripping, injecting, and/or pouring. In another example, one or more of the products can be applied to the soil via an irrigation or watering system. For example, one or more of the products can be introduced to the irrigation or watering system and applied to the soil when the water is also applied to the soil and/or plants. Introducing one or more of the products to the soil via an irrigation system can also reduce, inhibit, and/or prevent the formation of mineral scales within water transfer lines of the irrigation system. If one or more of the products are applied to the soil via an irrigation or other watering system, the one or more products can be mixed or otherwise combined with the water also applied to the soil via the irrigation system in any desired amount. For example, the amount the one or more of the products combined with the water in the irrigation or other application system can be from about 0.00001 wt %, about 0.0001 wt %, about 0.001 wt %, about 0.01 wt %, about 0.1 wt %, about 1 wt %, or about 5 wt %, to a high of about 10 wt %, about 20 wt %, about 30 wt %, about 40 wt %, about 50 wt %, about 60 wt %, about 70 wt %, about 80 wt %, about 90 wt %, about 95 wt %, about 99 wt %, or about 100 wt %, based on the weight of the one or more products and the water, with suitable ranges including the combination of any lower amount(s) and/or any upper amount(s).

Wither regard to the system depicted in FIG. 1, if the one or more elements or nutrients is combined with one or more of the products, the one or more elements can be combined at any stage or step of producing the one or more products. For example, the one or more elements can be combined with the oxidized product of line 116 and the resulting mixture can be applied to the soil. In another example, the one or more elements can be combined with the oxidized product of line 116 and the resulting mixture can be combined with one or more base compounds and the resulting neutralized mixture can then be applied to the soil. In another example, the one or more elements can be combined with the neutralized product of line 116 and the resulting mixture can be applied to the soil. The one or more elements or nutrients can be combined with one or more of the products of FIG. 2 in a similar manner.

With regard to the system depicted in FIG. 3, if the one or more elements or nutrients is combined with one or more of the products, the one or more elements or nutrients can be combined at any stage or step of producing the one or more products. For example, the one or more elements can be combined with the reacted product in line 119 and the resulting mixture can be applied to the soil. In another example, the one or more elements can be combined with the reacted product in line 119 and the resulting mixture can then be combined with the one or more base compounds in line 325 and the resulting neutralized mixture can be applied to the soil. In another example, the one or more elements can be combined with the neutralized product in line 333 and the resulting mixture can be applied to the soil.

With regard to FIG. 4, if the one or more elements or nutrients is combined with one or more of the products, the one or more elements or nutrients can be combined at any stage or step of producing the one or more products. For example, the one or more elements can be combined with the oxidized product in line 419 and the resulting mixture can be applied to the soil. In another example, the one or more elements can be combined with the oxidized product in line 419 and the resulting mixture can then be combined with the one or more base compounds in line 325 and the resulting neutralized mixture can be applied to the soil. In another example, the one or more elements can be combined with the neutralized product in line 433 and the resulting mixture can be applied to the soil.

One or more of the reacted products in lines 116, 222, and/or 232 and/or the products via line 321, 333, 421, and/or 433 can be applied to soil at any desired time. For example, one or more of the products can be applied to soil during dormant or non-growing seasons. In another example, one or more of the products can be applied to soil during growing seasons. In other words, one or more of the reacted products in lines 116, 222, and/or 232 and/or the products via line 321, 333, 421, and/or 433 can be applied to the soil and/or plants or other vegetation growing in the soil. One or more of the products can be applied to the soil at any desired ambient temperature. For example, the temperature can range from a low of about −25° C., about 0° C., or about 5° C. to a high of about 20° C., about 30° C., about 40° C., or about 50° C.

As mentioned above, any one or more of the products can also be used to apply one or more elements to a soil. The one or more elements can be, for example, those elements typically referred to as minor, trace, or micronutrients. In another example, the one or more elements can be those typically referred to as macronutrients, e.g., primary and/or secondary nutrients. Illustrative elements or nutrients can include, but are not limited to, calcium (Ca), magnesium (Mg), sulfur (S), boron (B), copper (Cu), iron (Fe), chlorine (Cl), manganese (Mn), molybdenum (Mo), zinc (Zn), chromium (Cr), silicon (Si), sodium (Na), nickel (Ni), cobalt (Co), aluminum (Al), phosphorus (P), nitrogen (N), potassium (K), or any combination thereof.

The one or more elements can be in any desired form when mixed, blended, combined, or otherwise contacted with one or more of the products. For example, the one or more elements can be in the elemental form or in the form of an oxide, a hydroxide, an oxide/hydroxide, a hydride, a carbide, a carbonate, a bicarbonate, a nitrate, a nitrite, a nitride, a sulfate, a sulfite, a sulfide, a phosphate, a phosphide, a phosphate, or any combination thereof, when combined or otherwise contacted with one or more of the products. For example, iron can be in the form of iron metal (Fe), iron oxide(s), e.g., FeO, $FeO_2$, $Fe_2O_3$, and/or $Fe_3O_4$, iron hydroxides, e.g., $Fe(OH)_2$ and/or $Fe(OH)_3$), iron oxide/hydroxides, e.g., FeO(OH) and/or $FeO(OH).0.4H_2O$, or any combination thereof. In another example, calcium can be in the form of calcium metal (Ca), calcium oxide (CaO), calcium hydride ($CaH_2$), calcium carbonate ($CaCO_3$), calcium bicarbonate ($Ca(HCO_3)_2$), or any combination thereof.

One or more of the reacted products in lines 116, 222, and/or 232 and/or the products via line 321, 333, 421, and/or 433 can be used to solubilize or at least partially solubilize the one or more elements. For example, one or more of the reacted products in lines 116, 222, and/or 232 and/or the products via line 321, 333, 421, and/or 433 can convert one or more of the elements into a corresponding organic salt. The solubilized element(s) such as the corresponding organic salt can then be utilized by plants or vegetation growing in the soil. For example, calcium hydroxide and/or other elements or nutrients can be chelated with one or more of the reacted products in lines 116, 222, and/or 232 and/or the products via line 321, 333, 421, and/or 433.

The one or more reacted products in lines 116, 222, and/or 232 and/or the products via line 321, 333, 421, and/or 433 and the one or more elements can be combined with one another under any suitable conditions. For example, the one or more elements can be combined with one or more of the reacted products in lines 116, 222, and/or 232 and/or the products via line 321, 333, 421, and/or 433 under atmospheric temperature and pressure. In another example, the one or more reacted products in lines 116, 222, and/or 232 and/or the products via line 321, 333, 421, and/or 433 and the one or more elements can be combined with on another at a temperature ranging from a low of about −25° C., about 0° C., or about 10° C. to a high of about 20° C., about 50° C., about 100° C., or about 150° C. In another example, the one or more reacted products in lines 116, 222, and/or 232 and/or the products via line 321, 333, 421, and/or 433 and the one or more elements can be combined with one another at atmospheric pressure or a pressure ranging from vacuum, e.g., 50 kPa to a high of about 110 kPa, about 500 kPa, about 1,000 kPa, or about 2,000 kPa.

The presence and/or amount of any given element(s) or nutrient(s) that may be solubilized via mixing with one or more of the reacted products in lines 116, 222, and/or 232 and/or the products via line 321, 333, 421, and/or 433 can widely vary and can depend, at least in part, on the particular make-up or composition of the soil to which the one or more products is to be applied. Said another way, the particular amount of any given element or combination of elements can vary depending, at least in part, on the particular soil to be treated. For example, a soil deficient in calcium, but sufficient in iron can be treated by applying one or more of the products combined with calcium but not iron. As such, the amount of the one or more elements or nutrients combined with one or more of the products can be from a low of about 0.00001 wt %, about 0.0001 wt %, about 0.001 wt %, about 0.01 wt %, about 0.1 wt %, about 1 wt %, about 2 wt %, about 3 wt %, or about 5 wt % to a high of about 10 wt %, about 20 wt %, about 30 wt %, about 40 wt %, or about 50 wt %, based on the combined weight of the one or more products and the one or more elements, with suitable ranges including the combination of any lower amount(s) and/or any upper amount(s). As such, dilute or small amounts of the one or more elements or rather large or concentrated amounts of the one or more elements can be solubilized with one or more of the products. Additionally, one or more first elements or nutrients can be combined with one or more of the products in a first amount or concentration and one or more second elements or nutrients can be combined with the one or more products in a second amount, where the first and second amounts are the same or different with respect to one another. Any number of elements or nutrients can be combined with one or more of the products and the amount of each element or nutrient can be the same or vary with respect to one another.

In addition to or in lieu of solubilizing one or more elements or nutrients with one or more of the products and applying the mixture containing the solubilized element(s) or nutrient(s) to soil, the one or more products can solubilize elements already present within the soil. For example, iron, copper, calcium hydroxide, and other elements or nutrients (in elemental or other form, e.g., as an oxide and/or hydroxide) can be solubilized within the soil by applying, treating, or otherwise contacting the soil with one or more of the products. Said another way, the reacted products in lines 116, 222, and/or 232 and/or the products via line 321, 333, 421, and/or 433 can be used to convert existing elements or nutrients in the soil that cannot be utilized by growing plants or crops because of the particular form the existing elements or nutrients are present into a solubilized form that can be utilized by the growing plants or crops. As such, any one or more of the products can be used alone to adjust the pH of the soil and/or to act as a fertilizer by converting non-usable elements or nutrients present in the soil into a form usable by plants or crops. Additionally, if a soil is deficient in a particular element(s) that element(s) can be selectively solubilized by combining with one or more of the reacted products in lines 116, 222, and/or 232 and/or the products via line 321, 333, 421, and/or 433 and that mixture can be applied to the soil. Alternatively, the desired element(s) or nutrient(s) can be applied to the soil before, during, and/or after one or more of the reacted products in lines 116, 222, and/or 232 and/or the products via line 321, 333, 421, and/or 433 is applied to the soil.

Any one or more of the products can be applied to any type of soil having any type of composition. The soil can be composed of, at least in part, sand particles, silt particles, clay particles, or any combination thereof. The soil can be coarse grained, e.g., sands and gravels, fine grained, e.g., silts and clays, highly organic, e.g., soils typically referred to as peat, or any combination thereof. Other common names for soils to which one or more of the products can be applied can include, but are not limited to, those referred to as sandy soils, silty soils, clay soils, loamy soils, peaty soils, chalky soils, saline soils, or any combination thereof.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example I

In Example I, an existing well (Well A) that could be produced twice a day for an hour (on pump) for a total of about 4 to about 6 bbls of fluid per day before pumping off was evaluated. A produced water from a different well/different zone was introduced into Well A. The result was an immense calcium carbonate problem. The well had to be completely shut down due to calcium carbonate scaling within the production line as well as near the wellbore and within the formation. More water was attempted to be introduced/forced into the formation in an attempt to open the formation. The well was pressured up to about 4,500 psi but no more water flowed into the formation.

A three hundred (300) gallon "pill" of a reacted product was introduced into the Well A. The reacted product or pill was prepared according to the following process: a biodiesel waste product was mixed with a sufficient amount of hydrochloric acid (HCl) to adjust the pH to about 3 at room temperature and pressure. The mixture was allowed to separate into a glycerol-rich portion and a fatty acids-rich portion. The fatty acids-rich portion was then separated from the glycerol-rich portion. A 30 wt % hydrogen peroxide solution was then added to and reacted with the glycerol-rich portion to produce the reacted product. The amount of hydrogen peroxide added to the glycerol-rich portion was about 10 wt %, based on the total weight of the glycerol-rich portion. From the reacted product, the three hundred gallon pill was acquired.

The three hundred gallon pill was then introduced into Well A via a pump truck. After introduction of the pill, Well A was pressured up to about 1,750 psi and then shut in. After about 1.5 hours, the pressure on Well A was about 0 psi. Well A was left shut in for about 48 hours, after which time Well A was brought back on line. After bringing Well A back on line, about 65+ bbls of total fluid/day were produced with no stoppage. The oil production fluctuated between about 15 bbls per day and about 25 bbls per day.

Example II

In Example II, a second well (Well B) was producing about 65 bbls per day and had a bottom hole temperature of about 130° F. to about 150° F. The well was treated with another produced water, similar to Example I above, i.e., produced water from another well/zone, and production from the well dropped to about 0.4 bbls of total fluid per day. Well B could only be pumped for about 5 hours before pumping off.

A 503 gallon pill of the same reacted product used in Example I was introduced into Well B. The pill was introduced at 10:17 AM and at 10:24 AM, pressuring up of the well was started. At 10:52 AM the final amount of the pill was introduced and Well B was shut in and had a pressure of about 1,300 psi. At 10:54 AM a bullplug was put into the well and the pressure on the well was down to about 1,000 psi. At 11:25 AM the pressure of the still shut in well was about 0 psi. The following day the well was under a vacuum. An operator began pulling on the well with great returns. The returns after sending the pill into Well b was greater than 85 bbls of total fluid/day.

Example III

In Example III, a third well (Well C) that began building pressure was treated. Well C was a disposal well for disposing of salt water. It was determined that the pressure in Well C was building due to tank bottoms. A 500 gallon pill of the same reacted product used in Example I was introduced into Well C and after about 2 hours, the pressure dropped about 200 psi and additional salt water could again be injected into Well C.

Example IV

A reacted product was prepared from a glycerol-containing feed that had a composition of 1.17 wt % potassium sulfate, 14 wt % methanol, 25 wt % fatty acids, 10 wt % water, and 49.83% glycerol. The moles of glycerol in the glycerol-containing feed were calculated and an equal number of moles of phosphoric acid were measured out to produce a glycerol-containing feed to phosphoric acid molar ratio of 1:1. About 10% of the phosphoric acid was mixed with four parts water to produce a diluted phosphoric acid solution. The diluted phosphoric acid solution was added to and mixed with the glycerol-containing feed. The pH of the glycerol-containing feed was lowered from 11 to less than 3. The mixture was then heated to a temperature of about 100° F. and the fatty acids separated to the top of the mixture and were removed. The components remaining in the mixture were the glycerol, water, salts, phosphoric acid, and methanol. The mixture was then heated to a temperature of about 150° F. to remove the methanol therefrom. The additional water added to the phosphoric acid prevented the formation of methylphosphoric acid during the heating used to remove the methanol. Methylphosphoric acid exhibits beneficial properties, but since methylphosphoric acid is not soluble in water it can be desirable to remove the methanol from the mixture. After the methanol was removed the remaining phosphoric acid, i.e., the remaining 90%, was added to the mixture. The mixture was then heated to a temperature of about 200° F. to about 220° F. during which water was driven off. The mixture was heated until the water content of the solution was about 8.7 wt %. The resulting reacted product was a viscous, amber colored mixture that had a gravity of 1.58 g/L at 60° F. and a refractive index (RI) of 1.4598 at 60° F.

The reacted product was mixed with an equal amount of water to produce diluted reacted product. The freezing point of the diluted reacted product was less than −30° F. The diluted reacted product was then tested on three different types of scales and two corroded metals.

The removal of calcium carbonate scale (Ex. 1), calcium sulfate scale (Ex. 2a and 2b), and barium sulfate scale (Ex. 3) were evaluated. In each example, reacted product was contacted with the scale and the results were evaluated. In Example 1 about 2.7 g of a calcium carbonate scale recovered from an east Texas oil well was placed in a beaker with 50 mL of the diluted reacted product at a temperature of 140° F. The calcium carbonate scale was dissolved in 3 hours. In Example 2a about 1.9 grams of a calcium sulfate scale recovered from a west Texas oil well was placed in a beaker with 50 mL of the diluted reacted product at a temperature of 140° F. The calcium sulfate scale dissolved in 5 hours. In Example 2b, which was carried out under similar conditions as in Ex. 2a, the calcium sulfate scale dissolved in 2.5 hours. In Ex. 3 about 1.92 grams of a barium sulfate scale recovered from a west Texas oil well was placed into a beaker with 50 mL of the diluted reacted product at a temperature of 140° F. After 5 hours 0.41 grams of the barium sulfate scale had dissolved.

In another example (Ex. 4), the removal of metal corrosion, i.e., rust, from iron and steel was evaluated. A rusty iron nail was placed in 100 mL of the diluted reacted product at a temperature of 72° F. After 12 hours the rust had been removed and a gray-black film of phosphate had been deposited onto the surface of the nail. In another test (Ex. 5), a piece of steel having iron sulfide scale was placed in 50 mL of the diluted reacted product at 72° F. After 12 hours the iron sulfide scale had been removed and a gray-black film of phosphate had been deposited on the surface of the steel.

Example V

A neutralized reacted product was also prepared. A portion of the reacted product prepared above in Example IV was neutralized with NaOH to have a pH of 6.8. The neutralized reacted product was then mixed with an equal amount of water to produce a diluted neutralized reacted product. The freezing point of the diluted neutralized reacted product was less than −30° F.

The reduction or prevention of calcium sulfate scale (Ex. 6) and barium scale (Ex. 7) with the neutralized reacted were evaluated. In Ex. 6, about 1,000 ppm of the diluted neutralized reacted product in synthetic brine was 100% effective in preventing the formation of calcium sulfate scale. In Ex. 7, about 1,000 ppm of the diluted neutralized reacted product was found to be about 90% effective in preventing the formation of barium scale. The tests were carried out according to the standard test procedures discussed and described in U.S. Pat. No. 5,167,828.

The removal of metal corrosion, i.e., rust, (Ex. 8) from iron was also evaluated. In Ex. 8 a rusty nail was placed in 100 mL of the diluted neutralized reacted product and left at room temperature. After four days the rust was completely removed from the nail and a protective gray-black phosphate layer had been deposited on the surface of the nail.

Example VI

An exemplary oxidized product was also prepared from the glycerol-containing feed used in Example IV that had a composition of 1.17 wt % potassium sulfate, 14 wt % methanol, 25 wt % fatty acids, 10 wt % water, and 49.83 wt % glycerol. The moles of glycerol in the glycerol-containing feed were calculated and an equal number of moles of phosphoric acid were measured out to produce a glycerol-containing feed to phosphoric acid molar ratio of 1:1. About 10% of the phosphoric acid was mixed with four parts water to produce a dilute phosphoric acid solution. The dilute phosphoric acid solution was added to and mixed with the glycerol-containing feed. The pH of the glycerol-containing feed was lowered from 11 to less than 3. The mixture was then heated to a temperature of about 100° F. and the fatty acids separated to the top of the mixture and were removed. The components remaining in the mixture were the glycerol, water, salts, phosphoric acid, and methanol.

A 50% solution of hydrogen peroxide ($H_2O_2$) was added to the mixture in an amount of about 12 wt %, based on the total weight of the mixture, and mixed for 6 hours. After mixing for 6 hours the mixture was heated to a temperature of about 150° F. to remove the methanol therefrom. After the methanol was removed the remaining phosphoric acid, i.e., the remaining 90%, was added to the mixture. The mixture was then heated to a temperature of about 220° F. during which water driven off. The mixture was heated until the water content of the solution was about 14 wt %. The resulting oxidized product was a clear, light yellow colored solution with a gravity of 1.46 g/L at 60° F. and a refractive index (RI) of 1.4405 at 60° F. The oxidized product was mixed with distilled water to produce a 40% solution of the oxidized product in water. The freezing point of the 40% solution of oxidized product was less than −30° F.

The removal of calcium sulfate (Ex. 9) was evaluated. In Ex. 9, about 2.81 g of a calcium sulfate scale recovered from an east Texas oil well was placed in a beaker with 50 mL of the 40% solution of the oxidized product at 52° F. After less than 3 hours the scale was dissolved.

The effect of the oxidized product on deswelling polymers (Ex. 10a and 10b) and clay (Ex. 11) were also conducted. In Ex. 10a, the 40% solution of the oxidized product was found to dehydrate and unswell a polyamide water soluble polymer. In Ex. 10b, the 40% solution of the oxidized product was found to dehydrate and unswell a polyacrylate water soluble polymer. In Ex. 11, the 40% solution of the oxidized product was also found to unswell bentonite clay.

Embodiments of the present invention further relate to any one or more of the following paragraphs:

1. A method for treating soil, comprising: applying a partially oxidized reaction product to a soil, wherein the partially oxidized reaction product is prepared by decreasing a pH of a mixture comprising glycerol and fatty acids to produce a mixture comprising a glycerol-rich portion and a fatty acids-rich portion and reacting the glycerol-rich portion with at least one of an oxidant and a catalyst at conditions sufficient to produce the partially oxidized reaction product.

2. The method according to paragraph 1, wherein the partially oxidized reaction product comprises glyceric acid, oxalic acid, glycolic acid, formic acid, or any combination thereof.

3. The method according to paragraph 1, wherein the partially oxidized reaction product comprises about 1 wt % to about 80 wt % glyceric acid, about 0.1 wt % to about 10 wt % oxalic acid, about 0.1 wt % to about 3 wt % glycolic acid, and about 1 wt % to about 40 wt % formic acid.

4. The method according to any one of paragraphs 1 to 3, wherein reacting at least one of the oxidant and the catalyst with the glycerol-rich portion comprises maintaining the temperature of the reaction below about 65° C.

5. The method according to any one of paragraphs 1 to 4, further comprising adding one or more base compounds to the partially oxidized reaction product to produce a neutralized product, wherein the neutralized product is applied to the soil.

6. The method according to paragraph 5, wherein the one or more base compounds comprises sodium hydroxide, potassium hydroxide, or a combination thereof.

7. The method according to any one of paragraphs 1 to 6, wherein the oxidant comprises oxygen, ozone, hydrogen peroxide, sodium permanganate, potassium permanganate, sodium persulfate, potassium persulfate, magnesium peroxide, calcium peroxide, sodium percarbonate, or any combination thereof.

8. The method according to any one of paragraphs 1 to 7, wherein the catalyst comprises platinum, palladium, carbon supported platinum, potassium permanganate, chromium oxide, carbon supported palladium, silicates, aluminophosphates, or any combination thereof.

9. The method according to any one of paragraphs 1 to 8, wherein the pH of the mixture comprising glycerol and fatty acids is greater than about 5.5, a pH of the mixture comprising the glycerol-rich portion and the fatty acids-rich portion ranges from about 3.5 to about 5, and a pH of the partially oxidized reaction product is less than about 3.5.

10. The method according to any one of paragraphs 1 to 9, wherein decreasing the pH of the mixture comprising glycerol and fatty acids comprises adding an acid to the mixture, and wherein the acid is not a fatty acid.

11. The method according to paragraph 10, wherein the oxidant comprises hydrogen peroxide, ozone, or a combination thereof, and wherein the acid comprises one or more inorganic acids, one or more organic acids, or any combination thereof.

12. The method according to any one of paragraphs 1 to 11, further comprising filtering at least a portion of the glycerol-rich portion to remove at least a portion of any solids contained therein.

13. The method according to any one of paragraphs 1 to 12, further comprising maintaining the mixture comprising glycerol and fatty acids at a temperature of from about 25° C. to about 65° C. while decreasing the pH of the mixture.

14. The method according to any one of paragraphs 1 to 13, wherein the partially oxidized reaction product has a pH of less than about 3.5 and the method further comprises adding a base compound to the partially oxidized reaction product to produce a neutralized product having a pH from about 5.5 to about 8.5, wherein the neutralized product is applied to the soil.

15. The method according to any one of paragraphs 1 to 14, further comprising solubilizing one or more elements selected from the group consisting of: calcium, magnesium, sulfur, boron, copper, iron, chlorine, manganese, molybdenum, zinc, chromium, silicon, sodium, nickel, cobalt, aluminum, phosphorus, nitrogen, potassium, and any combination thereof, by mixing the one or more elements with the partially oxidized reaction product.

16. The method according to paragraph 15, wherein the one or more elements is in the elemental form, in the form of an oxide, in the form of a hydroxide, in the form of an oxide/hydroxide, in the form of a hydride, in the form of a carbide, in the form of a carbonate, in the form of a bicarbonate, in the form of a nitrate, in the form of a nitrite, in the form of a nitride, in the form of a sulfate, in the form of a sulfite, in the form of a sulfide, in the form of a phosphate, in the form of a phosphide, in the form of a phosphate, or any combination thereof.

17. The method according to paragraph 15 or 16, wherein the one or more elements is solubilized prior to, during, or after the partially oxidized reaction product is applied to the soil.

18. The method according to any one of paragraphs 15 to 17, wherein the one or more solubilized elements is present in an amount of about 0.00001 wt % to about 40 wt %, based on the combined weight of the partially oxidized reaction product and the one or more elements.

19. The method according to any one of paragraphs 15, 16, 17, or 18, further comprising solubilizing one or more elements present within the soil by contacting the one or more elements with the partially oxidized reaction product within the soil, wherein the one or more elements is selected from the group consisting of: calcium, magnesium, sulfur, boron, copper, iron, chlorine, manganese, molybdenum, zinc, chromium, silicon, sodium, nickel, cobalt, aluminum, phosphorus, nitrogen, potassium, and any combination thereof.

20. A method for treating soil, comprising: applying a reacted product to a soil, wherein the reacted product is prepared by decreasing a pH of a mixture comprising glycerol and fatty acids to produce a mixture comprising a glycerol-rich portion and a fatty acids-rich portion and reacting the glycerol-rich portion with an acid comprising phosphorus at conditions sufficient to produce the reacted product.

21. The method according to paragraph 20, wherein the reacted product comprises glycerophosphoric acid, glycerol, and a portion of the acid.

22. The method according to paragraph 20, wherein reacting of the glycerol-rich portion and the acid is carried out in the presence of at least one of an oxidant and a catalyst to produce an oxidized product, and wherein the oxidized product is applied to the soil.

23. The method according to paragraph 22, wherein the oxidized product comprises a mixture of phosphoglyceric acid, glycerophosphoric acid, and water.

24. The method according to paragraph 22, wherein the oxidized product comprises a mixture of phosphoglyceric acid, glycerophosphoric acid, glycerol, water, any unreacted first acid, any unreacted second acid, or any combination thereof.

25. The method according to paragraph 22, wherein the oxidant comprises oxygen, ozone, hydrogen peroxide, sodium permanganate, potassium permanganate, sodium persulfate, potassium persulfate, magnesium peroxide, calcium peroxide, sodium percarbonate, or any combination thereof.

26. The method according to paragraph 22, wherein the catalyst comprises carbon supported platinum, carbon supported palladium, silicates, aluminophosphates, or any combination thereof.

27. The method according to paragraph 22, wherein the glycerol-rich portion is reacted with the at least one of the oxidant and the catalyst prior to reacting with the acid.

28. The method according to paragraph 22, wherein the glycerol-rich portion is reacted with the acid prior to reacting with the at least one of the oxidant and the catalyst.

29. The method according to paragraph 20 or 21, wherein reacting the glycerol-rich portion and the acid is carried out in the presence of at least one of an oxidant and a catalyst to produce an oxidized product, and the method further comprises mixing the oxidized product with one or more base compounds to produce a neutralized product having a pH ranging from about 6 to about 8, wherein the neutralized product instead of the reacted is applied to the soil.

30. The method according to any one of paragraphs 20 to 29, wherein the pH of the mixture comprising glycerol and fatty acids is greater than about 9, and a pH of the reacted product is less than about 3.5.

31. The method according to any one of paragraphs 20 to 30, wherein decreasing the pH of the mixture comprising glycerol and fatty acids adding an acid comprising phosphorus and water to the mixture, and wherein the acid and water is at a ratio of about 1:1 to about 1:10.

32. The method according to any one of paragraphs 20 to 31, wherein the glycerol-rich portion comprises methanol and the method further comprises heating the glycerol-rich portion to a temperature of from about 65° C. to about 90° C. before reacting the glycerol-rich portion with the acid to remove at least a portion of the methanol therefrom.

33. The method according to any one of paragraphs 20 to 32, wherein the glycerol-rich portion comprises about 5 wt % to about 45 wt % methanol and the method further comprises removing the methanol from the glycerol-rich portion by heating the glycerol-rich portion to a temperature of about 65° C. to about 90° C. to provide a methanol-lean glycerol-rich portion comprising about 1 wt % to about 35 wt % methanol.

34. The method according to any one of paragraphs 22 to 29, wherein the glycerol-rich portion comprises about 30 wt % to about 85 wt % glycerol, about 5 wt % to about 45 wt % methanol, about 5 wt % to about 40 wt % water, and about 1 wt % to about 15 wt % of one or more salts, and wherein the oxidized product comprises a mixture of phosphoglyceric acid, glycerophosphoric acid, and water.

35. The method according to any one of paragraphs 20, 21, or 30 to 33, further comprising solubilizing one or more elements selected from the group consisting of: calcium, magnesium, sulfur, boron, copper, iron, chlorine, manganese, molybdenum, zinc, chromium, silicon, sodium, nickel, cobalt, aluminum, phosphorus, nitrogen, potassium, and any combination thereof, by mixing the one or more elements with the reacted product.

36. The method according to paragraph 35, wherein the one or more elements is solubilized prior to, during, or after the partially reacted product is applied to the soil.

37. The method according to paragraph 35 or 36, wherein the one or more solubilized elements is present in an amount of about 0.00001 wt % to about 40 wt %, based on the combined weight of the reacted product and the one or more elements.

38. The method according to any one of paragraphs 20, 21, or 30 to 33, further comprising solubilizing one or more elements present within the soil by contacting the one or more elements with the reacted product within the soil, wherein the one or more elements is selected from the group consisting of: calcium, magnesium, sulfur, boron, copper, iron, chlorine, manganese, molybdenum, zinc, chromium, silicon, sodium, nickel, cobalt, aluminum, phosphorus, nitrogen, potassium, and any combination thereof.

39. The method according to any one of paragraphs 22 to 34, further comprising solubilizing one or more elements selected from the group consisting of: calcium, magnesium, sulfur, boron, copper, iron, chlorine, manganese, molybdenum, zinc, chromium, silicon, sodium, nickel, cobalt, aluminum, phosphorus, nitrogen, potassium, and any combination thereof, by mixing the one or more elements with the oxidized product.

40. The method according to paragraph 29, further comprising solubilizing one or more elements selected from the group consisting of: calcium, magnesium, sulfur, boron, copper, iron, chlorine, manganese, molybdenum, zinc, chromium, silicon, sodium, nickel, cobalt, aluminum, phosphorus, nitrogen, potassium, and any combination thereof, by mixing the one or more elements with the neutralized product.

41. The method according to paragraph 40, wherein the one or more elements is in the elemental form, in the form of an oxide, in the form of a hydroxide, in the form of an oxide/hydroxide, in the form of a hydride, in the form of a carbide, in the form of a carbonate, in the form of a bicarbonate, in the form of a nitrate, in the form of a nitrite, in the form of a nitride, in the form of a sulfate, in the form of a sulfite, in the form of a sulfide, in the form of a phosphate, in the form of a phosphide, in the faint of a phosphate, or any combination thereof.

42. The method according to any one of paragraphs 20, further comprising mixing the reacted product with one or more base compounds to produce a neutralized product having a pH ranging from about 6 to about 8, wherein the neutralized product is applied to the soil.

43. The method according to paragraph 42, further comprising solubilizing one or more elements selected from the group consisting of: calcium, magnesium, sulfur, boron, copper, iron, chlorine, manganese, molybdenum, zinc, chromium, silicon, sodium, nickel, cobalt, aluminum, phosphorus, nitrogen, potassium, and any combination thereof, by mixing the one or more elements with the neutralized product.

44. The method according to paragraph 43, wherein the one or more elements is in the elemental form, in the form of an oxide, in the form of a hydroxide, in the form of an oxide/hydroxide, in the form of a hydride, in the form of a carbide, in the form of a carbonate, in the form of a bicarbonate, in the form of a nitrate, in the form of a nitrite, in the form of a nitride, in the form of a sulfate, in the form of a sulfite, in the form of a sulfide, in the form of a phosphate, in the form of a phosphide, in the form of a phosphate, or any combination thereof.

45. A method for treating a soil, comprising: applying a partially oxidized reaction product to a soil, wherein the partially oxidized reaction product is prepared by reacting a glycerol-containing feed with at least one of an oxidant and a catalyst at conditions sufficient to produce the partially oxidized reaction product.

46. The method according to paragraph 41, wherein the partially oxidized reaction product comprises glyceric acid, oxalic acid, glycolic acid, formic acid, or any combination thereof.

47. The method according to paragraph 42, wherein preparation of the glycerol-containing feed comprises a glycerol-rich portion prepared by decreasing a pH of a mixture comprising glycerol and fatty acids to produce a mixture comprising the glycerol-rich portion and a fatty acids-rich portion.

48. A method for treating soil, comprising: applying a reacted product to a soil, wherein the reacted product is prepared by reacting a glycerol-containing feed with an acid comprising phosphorus at conditions sufficient to produce the reacted product.

49. The method according to paragraph 48, wherein a pH of a mixture comprising glycerol and fatty acids is decreased to produce a mixture comprising a glycerol-rich portion and a fatty acids-rich portion, and wherein the glycerol-containing feed comprises the glycerol-rich portion.

50. The method according to paragraph 48 or 49, wherein reacting the glycerol-containing feed with the acid is carried out in the presence of at least one of an oxidant and a catalyst to produce an oxidized product, and wherein the oxidized product is applied to the soil.

51. The method according to paragraph 50, wherein the oxidized product comprises a mixture of phosphoglyceric acid, glycerophosphoric acid, glycerol, water, any unreacted first acid, any unreacted second acid, or any combination thereof.

52. The method according to paragraph 50 or 51, wherein the oxidant comprises oxygen, ozone, hydrogen peroxide, sodium permanganate, potassium permanganate, sodium persulfate, potassium persulfate, magnesium peroxide, calcium peroxide, sodium percarbonate, or any combination thereof.

53. The method according to any one of paragraphs 50 to 52, wherein the catalyst comprises carbon supported platinum, carbon supported palladium, silicates, aluminophosphates, or any combination thereof.

54. The method according to any one of paragraphs 50 to 53, wherein the glycerol-containing feed is reacted with the at least one of the oxidant and the catalyst prior to reacting with the acid.

55. The method according to any one of paragraphs 50 to 53, wherein the reacted product is reacted with at least one of an oxidant and a catalyst to produce an oxidized product, and wherein the oxidized product is applied to the soil.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for treating soil, comprising:
applying a partially oxidized reaction product comprising glyceric acid, oxalic acid, glycolic acid, and formic acid to a soil, wherein the partially oxidized reaction product is prepared by decreasing a pH of a mixture comprising glycerol and fatty acids to produce a mixture comprising a glycerol-rich portion and a fatty acids-rich portion and reacting the glycerol-rich portion with at least one of an oxidant and a catalyst at conditions sufficient to produce the partially oxidized reaction product.

2. The method of claim 1, wherein the oxidant comprises oxygen, ozone, hydrogen peroxide, sodium permanganate, potassium permanganate, sodium persulfate, potassium persulfate, magnesium peroxide, calcium peroxide, sodium percarbonate, a catalyst, or any combination thereof.

3. The method of claim 1, wherein the partially oxidized reaction product comprises about 1 wt % to about 80 wt % glyceric acid, about 0.1 wt % to about 10 wt % oxalic acid, about 0.1 wt % to about 3 wt % glycolic acid, and about 1 wt % to about 40 wt % formic acid.

4. The method of claim 1, wherein reacting at least one of the oxidant and the catalyst with the glycerol-rich portion comprises maintaining the temperature of the reaction below about 65° C.

5. The method of claim 1, further comprising adding one or more base compounds to the partially oxidized reaction product to produce a neutralized product, wherein the neutralized product is applied to the soil.

6. The method of claim 1, further comprising solubilizing one or more elements selected from the group consisting of: calcium, magnesium, sulfur, boron, copper, iron, chlorine, manganese, molybdenum, zinc, chromium, silicon, sodium, nickel, cobalt, aluminum, phosphorus, nitrogen, potassium, and any combination thereof, by mixing the one or more elements with the partially oxidized reaction product.

7. The method of claim 6, wherein the one or more solubilized elements is present in an amount of about 0.00001 wt % to about 40 wt %, based on the combined weight of the partially oxidized reaction product and the one or more elements.

8. The method of claim 1, further comprising solubilizing one or more elements present within the soil by contacting the one or more elements with the partially oxidized reaction product within the soil, wherein the one or more elements is selected from the group consisting of: calcium, magnesium, sulfur, boron, copper, iron, chlorine, manganese, molybdenum, zinc, chromium, silicon, sodium, nickel, cobalt, aluminum, phosphorus, nitrogen, potassium, and any combination thereof.

9. A method for treating soil, comprising:
applying a reacted product to a soil, wherein the reacted product is prepared by decreasing a pH of a mixture comprising glycerol and fatty acids to produce a mixture comprising a glycerol-rich portion and a fatty acids-rich portion and reacting the glycerol-rich portion with an acid comprising phosphorus at conditions sufficient to produce the reacted product, wherein the reacted product comprises glycerophosphoric acid, unreacted glycerol, and unreacted acid.

10. The method of claim 9, wherein the glycerol-rich portion comprises about 30 wt % to about 85 wt % glycerol, about 5 wt % to about 45 wt % methanol, about 5 wt % to about 40 wt % water, and about 1 wt % to about 15 wt % of one or more salts.

11. The method of claim 9, wherein reacting the glycerol-rich portion and the acid is further reacted with at least one of an oxidant and a catalyst to produce an oxidized product, and wherein the oxidized product is applied to the soil.

12. The method of claim 11, wherein the oxidized product comprises a mixture of phosphoglyceric acid, glycerophosphoric acid, and water.

13. The method of claim 11, wherein the glycerol-rich portion is reacted with the at least one of the oxidant and the catalyst prior to reacting with the acid.

14. The method of claim 11, wherein the glycerol-rich portion is reacted with the acid prior to reacting with the at least one of the oxidant and the catalyst.

15. The method of claim 9, wherein reacting the glycerol-rich portion and the acid is carried out in the presence of at least one of an oxidant and a catalyst to produce an oxidized product, and the method further comprises mixing the oxidized product with one or more base compounds to produce a neutralized product having a pH ranging from about 6 to about 8, wherein the neutralized product instead of the reacted is applied to the soil.

16. The method of claim 9, further comprising solubilizing one or more elements selected from the group consisting of: calcium, magnesium, sulfur, boron, copper, iron, chlorine, manganese, molybdenum, zinc, chromium, silicon, sodium, nickel, cobalt, aluminum, phosphorus, nitrogen, potassium, and any combination thereof, by mixing the one or more elements with the reacted product.

17. The method of claim 9, wherein the one or more solubilized elements is present in an amount of about 0.00001 wt % to about 40 wt %, based on the combined weight of the reacted product and the one or more elements.

18. The method of claim 9, further comprising solubilizing one or more elements present within the soil by contacting the one or more elements with the reacted product within the soil, wherein the one or more elements is selected from the group consisting of: calcium, magnesium, sulfur, boron, copper, iron, chlorine, manganese, molybdenum, zinc, chromium, silicon, sodium, nickel, cobalt, aluminum, phosphorus, nitrogen, potassium, and any combination thereof.

19. The method of claim 11, further comprising solubilizing one or more elements selected from the group consisting of: calcium, magnesium, sulfur, boron, copper, iron, chlorine, manganese, molybdenum, zinc, chromium, silicon, sodium, nickel, cobalt, aluminum, phosphorus, nitrogen, potassium, and any combination thereof, by mixing the one or more elements with the oxidized product.

20. The method of claim 15, further comprising solubilizing one or more elements selected from the group consisting of: calcium, magnesium, sulfur, boron, copper, iron, chlorine, manganese, molybdenum, zinc, chromium, silicon, sodium, nickel, cobalt, aluminum, phosphorus, nitrogen, potassium, and any combination thereof, by mixing the one or more elements with the neutralized product.

\* \* \* \* \*